(12) United States Patent
Sato et al.

(10) Patent No.: US 7,663,073 B2
(45) Date of Patent: Feb. 16, 2010

(54) OPTICAL PROCESSING APPARATUS

(75) Inventors: Masahiro Sato, Hyogo (JP); Masashi Ishiguro, Hyogo (JP); Tomoko Fukunaka, Shiga (JP); Kazuhiko Yamashita, Hyoto (JP); Mamoru Watanabe, Hyogo (JP); Ryoji Inutsuka, Osaka (JP); Kenji Takahashi, Osaka (JP); Toshikazu Yoneda, Osaka (JP)

(73) Assignee: Panasonic Corporation, Osaka (JP)

( * ) Notice: Subject to any disclaimer, the term of this patent is extended or adjusted under 35 U.S.C. 154(b) by 241 days.

(21) Appl. No.: 10/833,072

(22) Filed: Apr. 28, 2004

(65) Prior Publication Data

US 2004/0226979 A1    Nov. 18, 2004

(30) Foreign Application Priority Data

May 13, 2003  (JP)  ............................. 2003-134096
May 14, 2003  (JP)  ............................. 2003-135814

(51) Int. Cl.
    *B23K 26/06*    (2006.01)
(52) U.S. Cl. ........................... 219/121.73; 219/121.82; 219/121.83; 219/121.78
(58) Field of Classification Search ............ 219/121.73, 219/121.82, 121.83, 121.76, 121.78; 228/41
    See application file for complete search history.

(56) References Cited

U.S. PATENT DOCUMENTS

| | | | | |
|---|---|---|---|---|
| 3,422,246 A | * | 1/1969 | Wetzel | ................... 219/121.67 |
| 3,448,280 A | * | 6/1969 | Blitchington, Jr. et al. | ...................... 250/227.11 |
| 4,074,104 A | * | 2/1978 | Fulkerson | .............. 219/121.69 |
| 4,899,924 A | * | 2/1990 | Kawaguchi | ............ 219/121.63 |
| 4,979,290 A | * | 12/1990 | Chiba | .......................... 29/840 |
| 5,052,338 A | * | 10/1991 | Maiorca et al. | ............. 118/668 |
| 5,122,635 A | * | 6/1992 | Knodler et al. | ........ 219/121.63 |

(Continued)

FOREIGN PATENT DOCUMENTS

JP    P2002-1521 A    1/2002

*Primary Examiner*—M. Alexandra Elve
(74) *Attorney, Agent, or Firm*—McDermott Will & Emery LLP

(57) ABSTRACT

An optical processing apparatus includes an emitter for emitting light, a first light path for directing the light to a position to be processed on a workpiece, and a processing head. The processing head includes an optical system provided in the first light path, for shaping the light, a second light path having a portion shared with the first light path, the second light path directing light reflected from the workpiece, and an optical receiver for receiving the reflected light from the second light path. The optical processing apparatus further includes an actuator for changing a positional relationship between the optical system and the workpiece, a feeder for supplying a solder to the workpiece, a first shifter for moving the processing head in a first direction in parallel to an optical axis of the light emitted from the emitter, a second shifter for positioning the feeder in the first direction away from the processing head when the processing head is moved away from the workpiece by the first shifter, and a third shifter for moving the feeder against the processing head in a second direction perpendicular to the first direction while the processing head is moved by the first shifter. The optical processing apparatus allows the spot of the incident light and the position of soldering to be readily set depending on the configuration of a workpiece and can thus solder the workpiece at higher quality under soldering conditions optimized for the workpiece.

15 Claims, 20 Drawing Sheets

U.S. PATENT DOCUMENTS

| | | | |
|---|---|---|---|
| 5,525,777 A * | 6/1996 | Kukuljan | 219/121.83 |
| 5,686,994 A * | 11/1997 | Tokura | 356/394 |
| 5,998,758 A * | 12/1999 | Moser et al. | 219/121.63 |
| 6,119,918 A * | 9/2000 | Yang et al. | 228/102 |
| 6,278,078 B1 * | 8/2001 | Walvoord et al. | 219/121.61 |
| 6,441,339 B1 * | 8/2002 | Ueno | 219/121.65 |
| 6,615,099 B1 * | 9/2003 | Muller et al. | 700/166 |

* cited by examiner

//OPTICAL PROCESSING APPARATUS

FIELD OF THE INVENTION

The present invention relates to an optical processing apparatus for processing a workpiece with a light energy.

BACKGROUND OF THE INVENTION

A conventional optical processing apparatus for processing a workpiece with a light energy is disclosed in Japanese Patent Laid-Open Publication No. 2002-1521 and includes a light energy emitter for outputting laser light as the light energy, a first light path for directing the laser light to the workpiece, an optical system provided in the first light path for shaping the laser light, and a second light path including a portion of the first light path commonly with the first light path for directing the laser light from the workpiece to an optical receiver. The optical receiver is provided in the second light path at a position separated from the first light path.

The conventional optical processing apparatus further includes a shutter having plural light passing apertures having different diameters for switching the diameter of an irradiating spot of the laser light.

In the switching of the diameter of the irradiating spot of the laser light with the shutter having the light passing apertures having the different diameters, the diameter of the irradiating spot of the laser light is dictated by the sizes of the light passing apertures.

Moreover, the conventional optical processing apparatus requires a controller in addition to the shutter for controlling operation of the light passing apertures. While the diameter of the irradiating spot of the laser light is switched depending on the size of soldering on the workpiece, the conventional apparatus cannot supply a wire solder automatically to a soldering position.

Although an image of the workpiece is directly received by the optical receiver in the conventional optical processing apparatus, the receiver captures a perspective view of the workpiece. The optical receiver includes through a light condensing system including a lens in the second light path, hence distorting the perspective view of the workpiece. Such distortion may be eliminated by locating the second light path perpendicularly to the workpiece.

The laser light emitted from the light energy emitter is dispersed at a dispersion angle and thus focused on the workpiece by the optical system. The light is focused appropriately in response to the characteristics of the light energy emitter. Light reflected on the workpiece is transmitted via the shaping system to the optical receiver. Since the shaping system has light focusing characteristic different from that of the optical receiver, the image of the workpiece received by the optical receiver may be distorted in radial directions from its center.

SUMMARY OF THE INVENTION

An optical processing apparatus includes an emitter for emitting light, a first light path for directing the light to a position to be processed on a workpiece, and a processing head. The processing head includes an optical system provided in the first light path, for shaping the light, a second light path having a portion shared with the first light path, the second light path directing light reflected from the workpiece, and an optical receiver for receiving the reflected light from the second light path. The optical processing apparatus further includes an actuator for changing a positional relationship between the optical system and the workpiece, a feeder for supplying a solder to the workpiece, a first shifter for moving the processing head in a first direction in parallel to an optical axis of the light emitted from the emitter, a second shifter for positioning the feeder in the first direction away from the processing head when the processing head is moved away from the workpiece by the first shifter, and a third shifter for moving the feeder against the processing head in a second direction perpendicular to the first direction while the processing head is moved by the first shifter.

The optical processing apparatus allows the spot of the incident light and the position of soldering to be readily set depending on the configuration of a workpiece and can thus solder the workpiece at higher quality under soldering conditions optimized for the workpiece.

DETAILED DESCRIPTION OF THE PREFERRED EMBODIMENTS

Exemplary Embodiment 1

Figure 1:
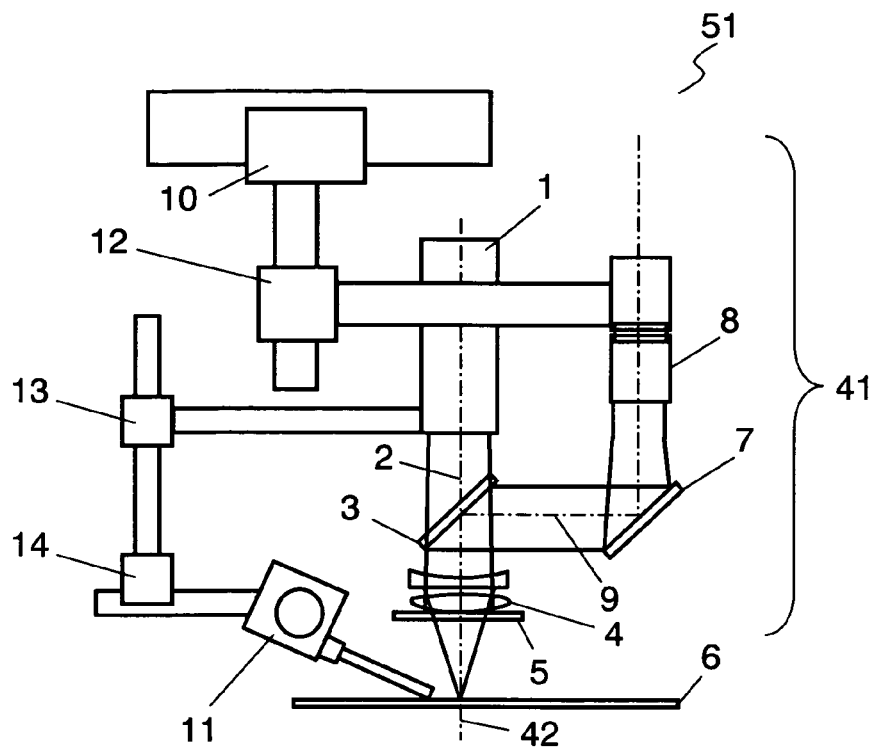
FIG. 1 is a schematic view of an optical processing apparatus according to Exemplary Embodiment 1 of the present invention.

FIG. 1 is a schematic view of an optical processing apparatus 51 according to Exemplary Embodiment 1 of the present invention. A light energy emitter 1 emits an energy of light, such as laser light. The laser light emitted from the light energy emitter 1 is dispersed at a predetermined dispersion angle and directed along a light path 2 to a workpiece. A half mirror 3 reflects a visible component of the light and allowing the other to pass. An optical system 4 including lenses has light collecting characteristics for shaping the light emitted from the light energy emitter 1, that is, for focusing the light to a desired size of a light spot in response to a degree of the dispersion. A detachable protective glass 5 protects the optical system 4 from being fouled with impurities generated during a processing operation. If the protective glass 5 is fouled with impurities, the energy of light output from the optical system 4 declines. After the protective glass 5 is replaced by a new one, the output from the optical system 4 is readily returned to its desired level. This structure allows the optical processing apparatus 51 to be maintained easily. A mirror 7 directs the light reflected from the workpiece 6 to an optical receiver 8, such as a camera. The light from the optical receiver 8 for monitoring the image of the workpiece 6 passes in a light path 9. The light energy emitter 1, the light path 2, the half mirror 3, the optical system 4, the protective glass 5, the optical receiver 8, and the light path 9 provides a processing head 41. An actuator 10 shifts the positional relationship between the workpiece 6 and the optical system 4. A feeder 11 supplies a solder. A shifter 12 moves the processing head 41 in parallel with the light axis 42 of light incident onto the workpiece 6, that is, in upward and downward directions with relation to the workpiece 6. A shifter 13 moves the feeder 11 in parallel with the light axis 42, that is, in the upward and downward directions with relation to the workpiece 6. A shifter 14 moves the feeder 11 perpendicularly to the light axis 42 or in leftward and rightward directions with relation to the workpiece 6.

An operation of the optical processing apparatus 51 having the foregoing arrangement will be explained.

The light emitted from the light energy emitter 1 is transmitted along the light path 2 to the half mirror 3, is collected to a desired diameter of the spot by the optical system 4, passes through the protective glass 5, and reaches the workpiece 6. The workpiece 6 is processed with the focused light. Light reflected from the workpiece 6 returns back through the protective glass 5 and the optical system 4, is reflected by the half mirror 3 to run along the light path 9, and is reflected again by the mirror 7 to enter the optical receiver 8.

Since the focused light is incident on a local point to be processed on the workpiece 6, its heating effect can hardly propagate throughout the workpiece 6. Since the processing head 4 is moved with relation to the workpiece 6 by the actuator 10, the apparatus has an area of the workpiece 6 extended.

Figure 23:
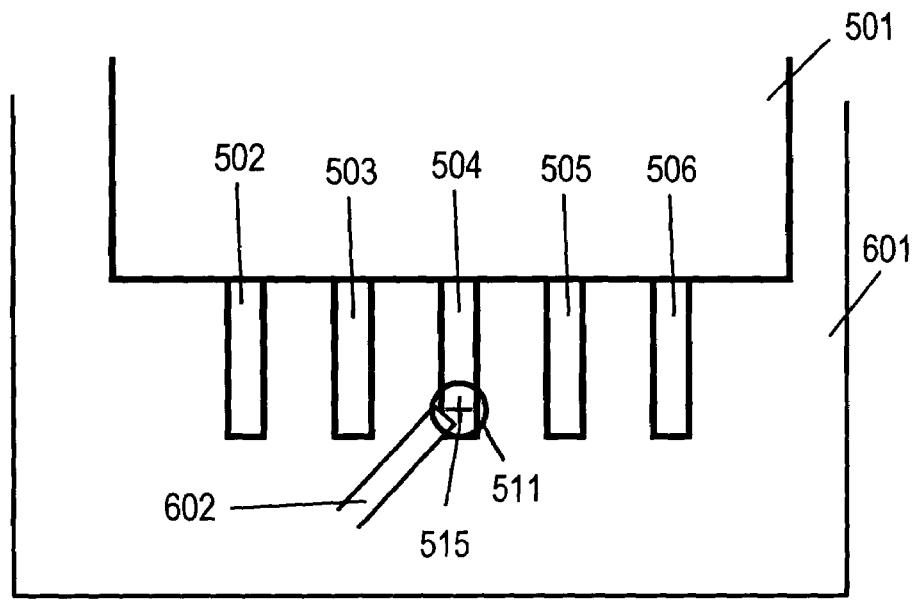
FIG. 23 shows a workpiece processed by the optical processing apparatus according to Embodiment 1.
Figure 24:
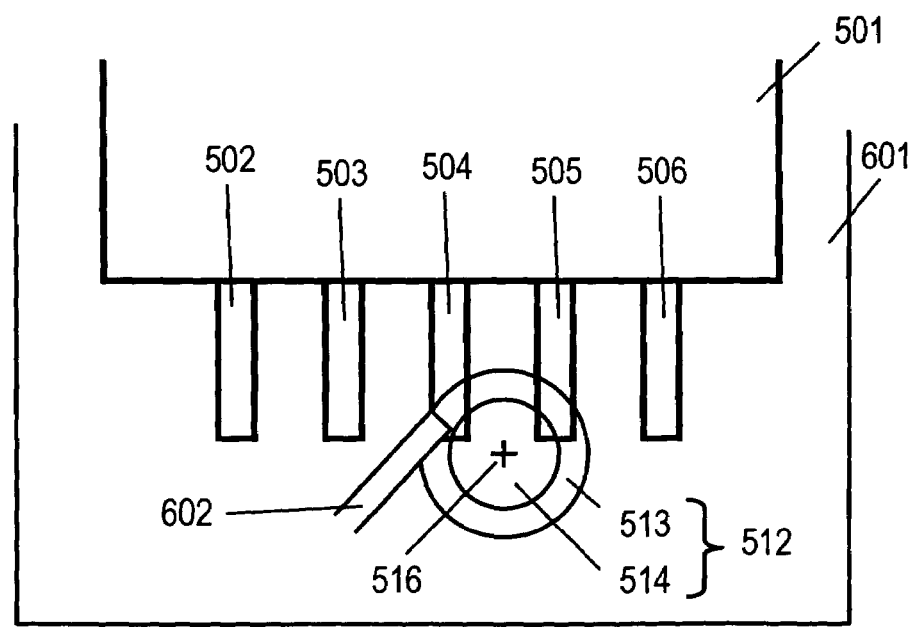
FIG. 24 shows the workpiece processed by the optical processing apparatus according to Embodiment 1.

The above operation will be described in detail. FIGS. 23 and 24 show an integrated circuit (IC) 501 including leads 502-506 as the workpiece processed by the optical processing apparatus 51.

As shown in FIG. 23, in order to solder leads 502-506 onto printed circuit board 601, focused light 511 having center 515 is radiated onto a single lead, for example, lead 504, and then, solder 602 is supplied at a place of the lead where light 511 is radiated.

As shown in FIG. 24, processing head 41 move away in parallel to the light axis 42 from printed circuit board 601 to spread a focus spot, light 512 is radiated onto the workpiece from processing head 41. Light 512 having center 516 is composed of center portion 514 having a low energy density and circumference portion 513 located out side of center portion 514 and having an energy density higher than that of center portion 514. Circumference portion 514 of light 512 is irradiated onto leads 504 and 505, and solder 602 is supplied to respective portions of leads 504 and 505 where circumference portion 514 is irradiated. The energy density in circumference portion 514 is lower than that in light 511 having a small focus diameter. Hence, light 512 shown in FIG. 24 can process a work piece having small resistance against heat, and a workpiece having plural leads around the workpiece which are processed at once. In this case, solder 602 is necessarily positioned at circumference portion 514 from center 516 with respect to light 512.

For processing shown in FIG. 23, according to a movement of processing head 41 by shifter 12 with respect to the work piece (IC 501 and printed circuit board 601), shifter 14 moves feeder 11 together with processing head 41 in order to position solder 602 at focus center 515 of light 511.

For processing shown in FIG. 24, shifter 12 moves processing head away from the workpiece. According to the movement, shifter 13 positions feeder 11 in a direction reverse to the moving direction of processing head 41, that is, away from processing head 41, so that solder 602 does not move away from the workpiece. Shifter 14 positions feeder 12 to position solder 602 at circumference portion 513 of light 512 from center 516. That is, a focus diameter is changed according to a workpiece, and a feeding position od a solder is changed according to the change of the diameter.

To change soldering shown in FIG. 24 into soldering shown in FIG. 23, shifter 12-14 moves the processing head and the feeder in directions reverse to those described above.

While the feeder 11 supplies an amount of solder, the processing head 41 directs the light to a target point of the workpiece 6 for soldering. The shifter 12 controls the size of the spot of the light on the workpiece 6 corresponding to the workpiece. The shifters 13 and 14 allow the soldering position to easily shift depending on the size of the spot of the incident light. In the optical processing apparatus 51 of Embodiment 1, both the processing head 41 and the feeder 11 can be moved separately by the shifters. Accordingly, since the soldering position is readily determined depending on the size of the spot of the incident light on the workpiece 6, conditions for the soldering can be optimized for the workpiece 6, hence improving the performance of the soldering operation.

Exemplary Embodiment 2

Figure 2:
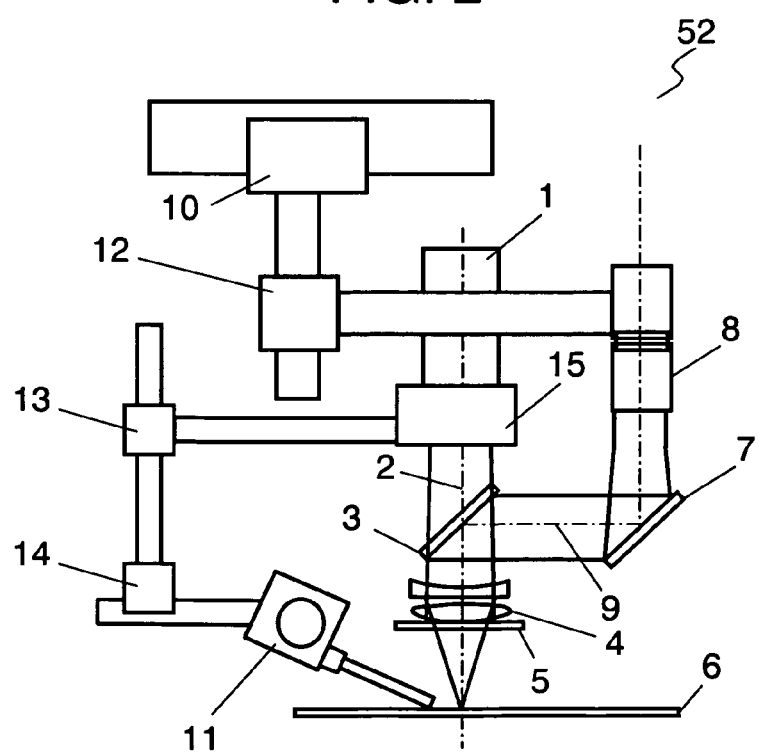
FIG. 2 is a schematic view of an optical processing apparatus according to Exemplary Embodiment 2 of the invention.

FIG. 2 is a schematic view of an optical processing apparatus 52 according to Exemplary Embodiment 2 of the present invention. In FIG. 2, the components including the light energy emitter 1 to the shifter 14 are identical to those of the optical processing apparatus 51 of Embodiment 1 shown in FIG. 1 and will be described in no more detail. The optical processing apparatus 52 of Embodiment 2 includes a shifter 15 for moving the solder feeder 11 along an arcuate direction about a position where light reaches the workpiece 6.

The optical processing apparatus 52 allows the feeder 11 to be moved to a desired position depending on the shape of the workpiece 6 more easily than the optical processing apparatus 51 of Embodiment 1. Since the shifter 11 is protected from striking against a side wall in the optical processing apparatus 52, the apparatus 52 has a processing range on the workpiece 6 wider than that of the optical processing apparatus 51 of Embodiment 1.

Exemplary Embodiment 3

Figure 3:
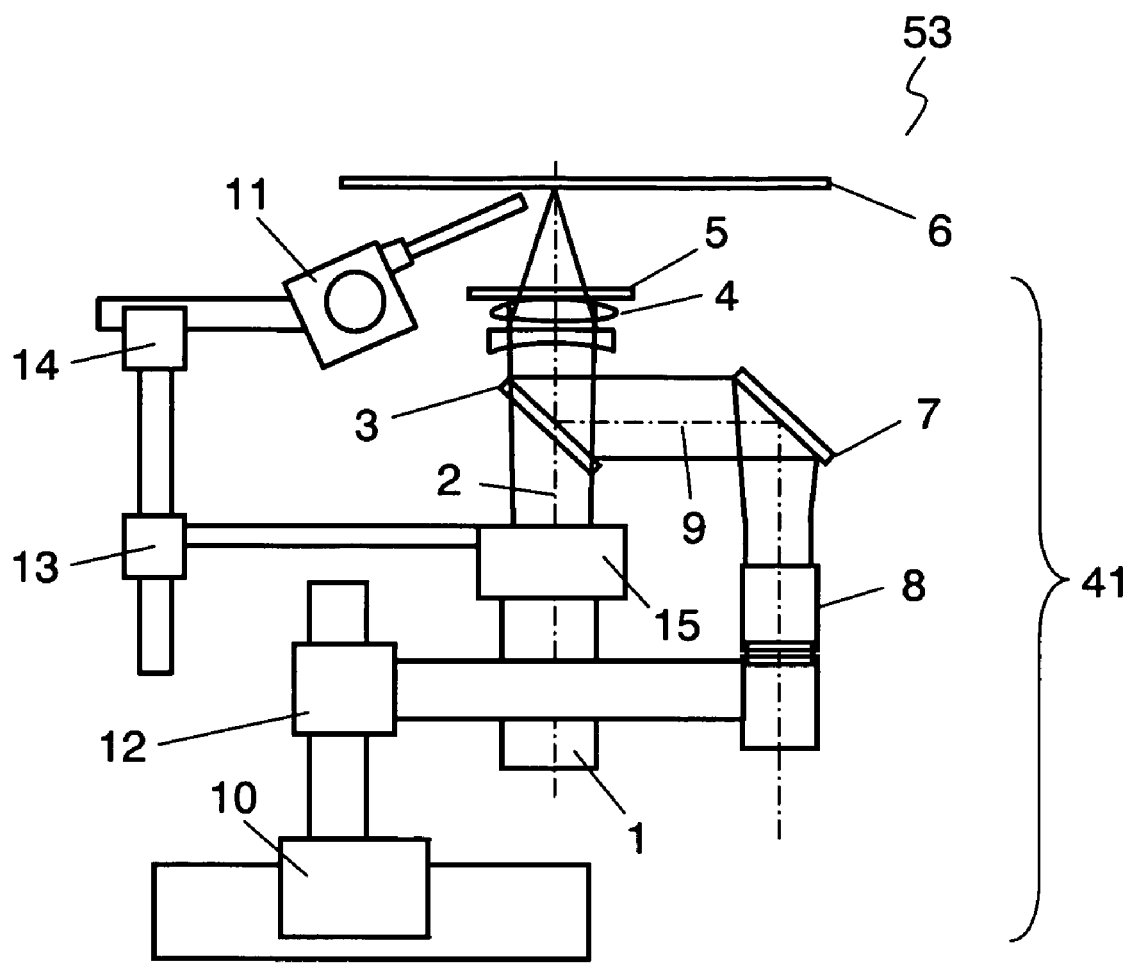
FIG. 3 is a schematic view of an optical processing apparatus according to Exemplary Embodiment 3 of the invention.

FIG. 3 is a schematic view of an optical processing apparatus 53 according to Exemplary Embodiment 3 of the present invention. As shown in FIG. 3, the components including the light energy emitter 1 to the shifter 15 in the processing head 41 are identical to those of the optical processing apparatus 52 of Embodiment 2 shown in FIG. 2 and will be described in no more detail. The optical processing apparatus 52 of Embodiment 3 has the processing head 41 located beneath and perpendicular to the workpiece 6 for processing a lower side of the workpiece 6.

The workpiece 6 in the optical processing apparatus 53 hence needs not be placed upside down for processing the lower side. since the optical processing apparatus 53 has no extra device for turning the workpiece 6 upside down, it allows the workpiece 6 not to be dislocated at the position to be processed nor fell down together with any component mounted on the workpiece 6. With no extra device for turning the workpiece 6 upside down, the optical processing apparatus 53 can process the workpiece at a smaller number of steps inexpensively.

Exemplary Embodiment 4

Figure 4:
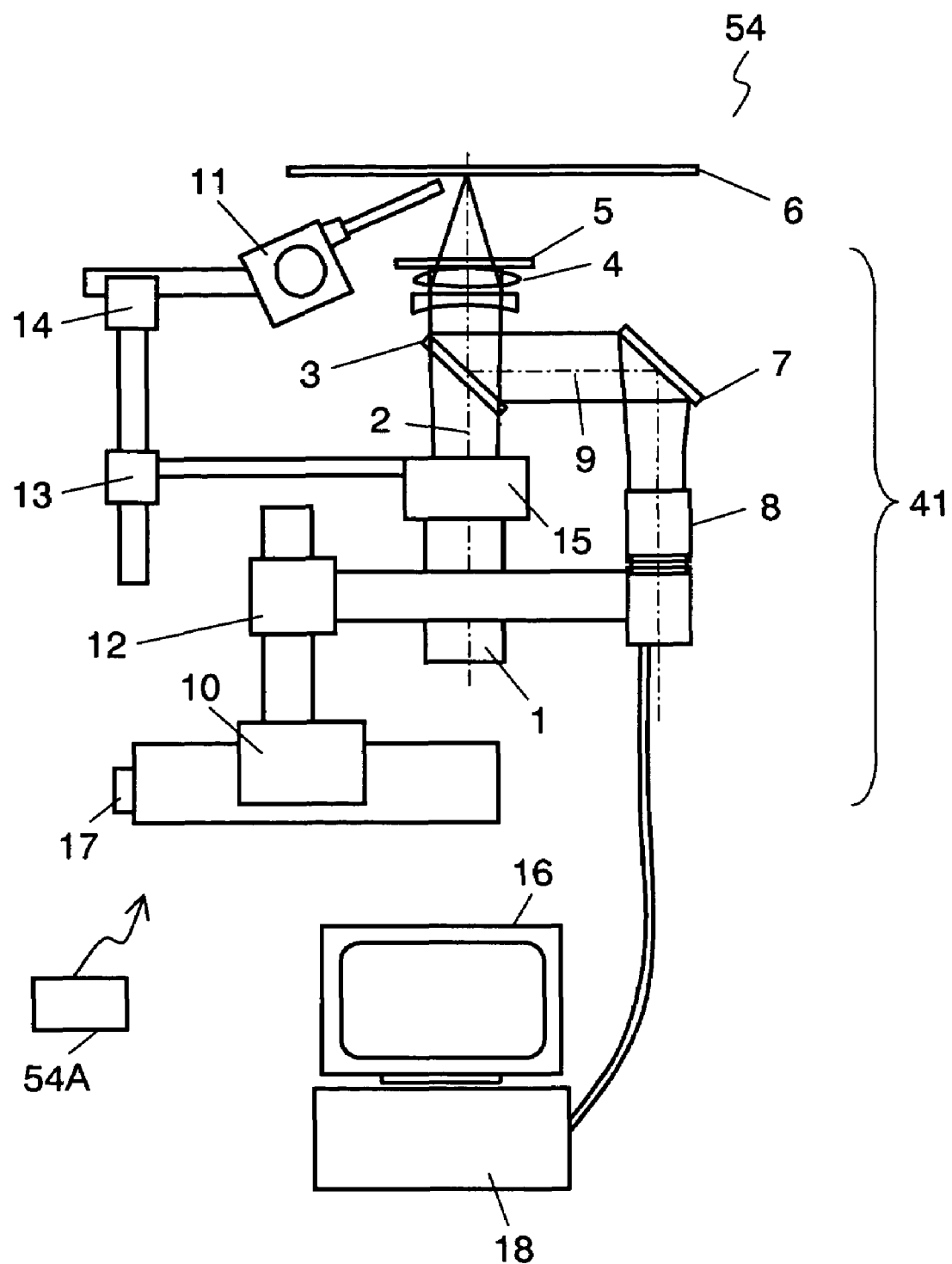
FIG. 4 is a schematic view of an optical processing apparatus according to Exemplary Embodiment 4 of the invention.

FIG. 4 is a schematic view of an optical processing apparatus 54 according to Exemplary Embodiment 4 of the present invention. As shown in FIG. 4, the components including the light energy emitter 1 to the shifter 15 in the processing head 41 are identical to those of the optical processing apparatus 53 of Embodiment 3 and will be explained in no more detail. The optical processing apparatus 54 of Embodiment 4 further includes a display 16, such as a CRT or liquid crystal display, an identifier 17 for identifying the position of the processing head 41, and a detector 18 for detecting the spot of the light output from the processing head 41.

In the optical processing apparatus 54, the detector 18 detects a position of the spot of the light on the workpiece 6 output from the processing head 41 based on data output from the identifier 17. Data of the position of the spot of the light is then transferred to the display 16. An optical image of the workpiece 6 is converted into an electrical signal by the optical receiver 8 and displayed on the display 16 together with the position of the spot of the incident light. This allows the position to be processed on a workpiece to be monitored easily even if the position on the lower side of the workpiece is small or is not visible. Also, the position to be processed can be identified when having been dislocated. The position can readily be obtained and corrected by a controller 54A for controlling an operation of the optical processing apparatus 54.

Exemplary Embodiment 5

Figure 5:
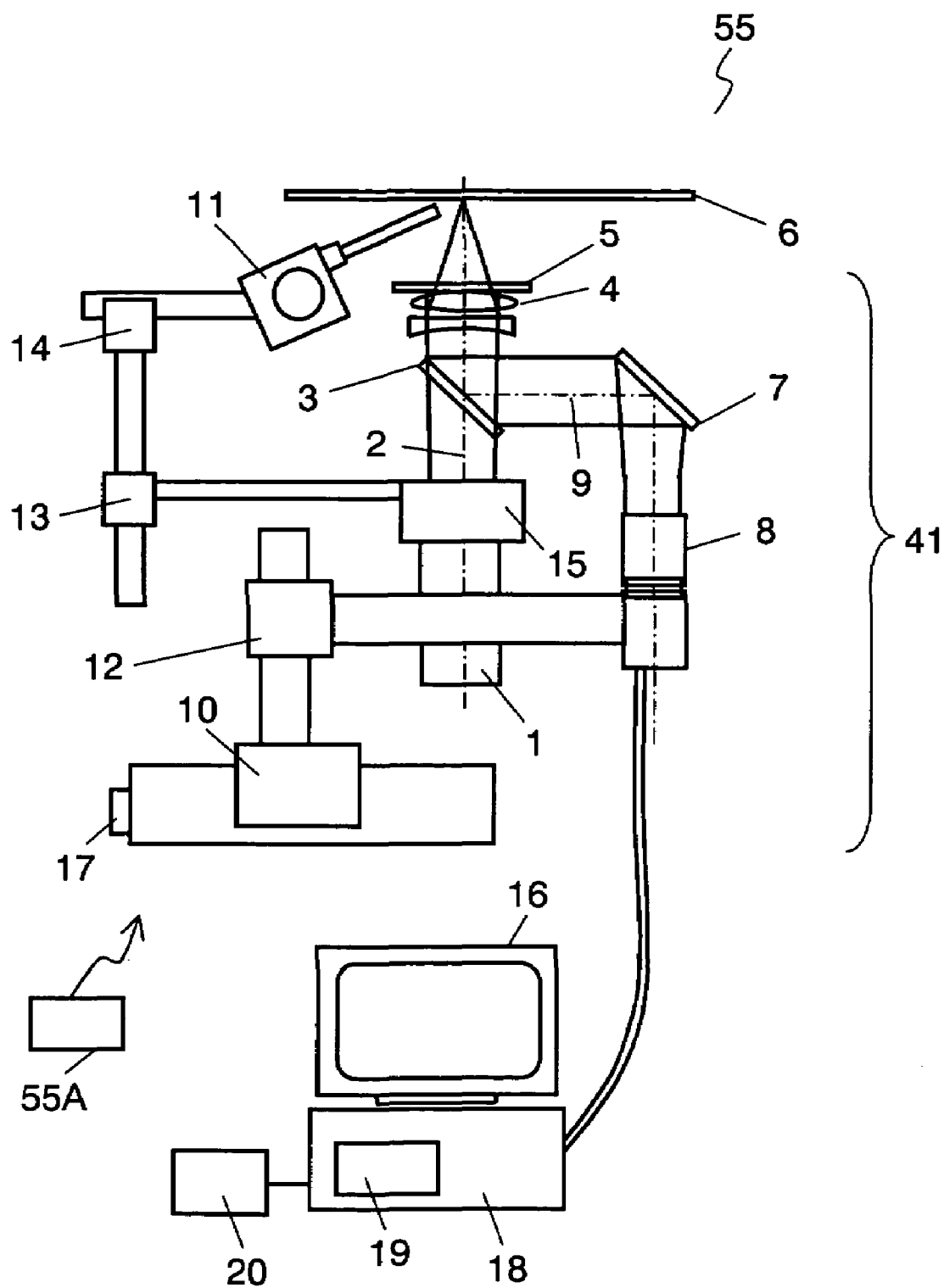
FIG. 5 is a schematic view of an optical processing apparatus according to Exemplary Embodiment 5 of the invention.

FIG. 5 is a schematic view of an optical processing apparatus 55 according to Exemplary Embodiment 5 of the present invention. As shown in FIG. 5, the components including the light energy emitter 1 to the shifter 15 in the processing head 41 are identical to those of the optical processing apparatus 54 of Embodiment 4 shown in FIG. 4 and will be described in no more detail. The optical processing apparatus 55 of Embodiment 5 further includes a corrector 19, such as an image recognition apparatus, and a memory 20. The corrector 19 detects and corrects a difference between the position to be processed on the workpiece 6 and the position of the spot of the light. The memory 20, such as a magnetic disk or a flash memory, stores the image in form of CAD data, scanner image, camera image, or the like.

An operation of the optical processing apparatus 55 of Embodiment 5 will be explained. The detector 18 detects the position of the processing head 41, which has been produced from the measurement of an encoder in the actuator 10 by the identifier 17, to locate the spot of the incident light on the workpiece 6. Data of the position of the spot of the incident light is then transferred to the display 16. An optical image of the workpiece 6 is converted into an electrical signal by the optical receiver 8 and displayed on the display 16 together with the position of the spot of the incident light. The corrector 19 calculates a difference between the position of the spot of the incident light from the processing head 41 and the position to be processed on the workpiece 6 from the optical receiver 8 and transmits the difference to the detector 18. In response, the detector 18 instructs the actuator 10 to properly locate the processing head 41 for eliminating the difference and switches the light energy emitter 1 on for processing the workpiece 6. This allows the workpiece 6 to be processed precisely even if the positioning has been imperfect.

The processing head 41 is held perpendicularly to the workpiece 6. The relative position of the processing head 41 to the workpiece 6 can be changed by the actuator 10. As the memory 20 stores the image of the workpiece 6, the image can displayed on the display 16. At this moment, the position of the spot of the incident light on the workpiece 6 can be displayed on the display 16. Accordingly, the memory 20 permits an operator to instruct the position at off line to a controller 55A for controlling an operation of the optical processing apparatus 55 with the position to be processed while monitoring the image of the workpiece 6 without interrupting an operation of a production line.

Exemplary Embodiment 6

Figure 6:
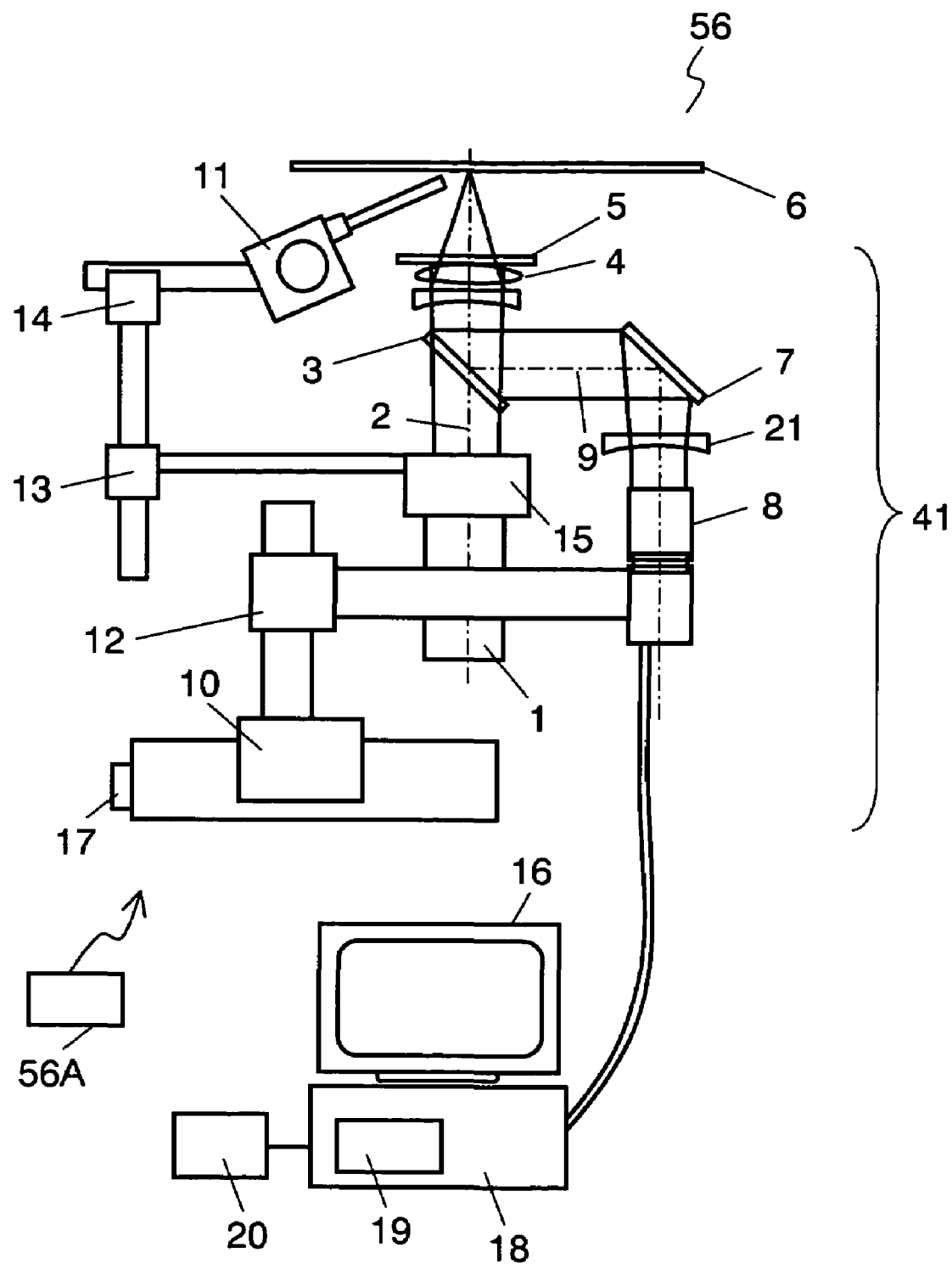
FIG. 6 is a schematic view of an optical processing apparatus according to Exemplary Embodiment 6 of the invention.

FIG. 6 is a schematic view of an optical processing apparatus 56 according to Exemplary Embodiment 6 of the present invention. As shown in FIG. 6, the components including the light energy emitter 1 to the shifter 15 in the processing head 41 are identical to those of the optical processing apparatus 55 of Embodiment 5 shown in FIG. 5 and will be described in no more detail. The optical processing apparatus 56 of Embodiment 6 further includes a corrector 21 provided between the mirror 7 and the optical receiver 8 for correcting a distortion of the image caused by the optical system 4.

An operation of the optical processing apparatus 56 will be explained.

The light from the workpiece 6 passes through the protective glass 5 and the optical system 4 and reflected by the half mirror 3. The reflected light then passes along the light path 9, is reflected again by the mirror 7, passes through the corrector 21, and reaches the optical receiver 8. The corrector 21 reduces the distortion of the image while not reducing accuracy during the instruction of the position of the spot of the incident light on the workpiece 6, the confirmation for correction, and the correction of identified position. The corrector 21 ensures the image of the workpiece 6 received with no distortion by the optical receiver, and accordingly, the optical processing apparatus 56 can identify any displacement of the workpiece and the size of the spot of the incident light on the workpiece while reducing the duration required for instructing the position of the spot of the incident light to a controller 56A for controlling an operation of the apparatus, hence soldering the workpiece 6 at high quality.

Exemplary Embodiment 7

Figure 7:
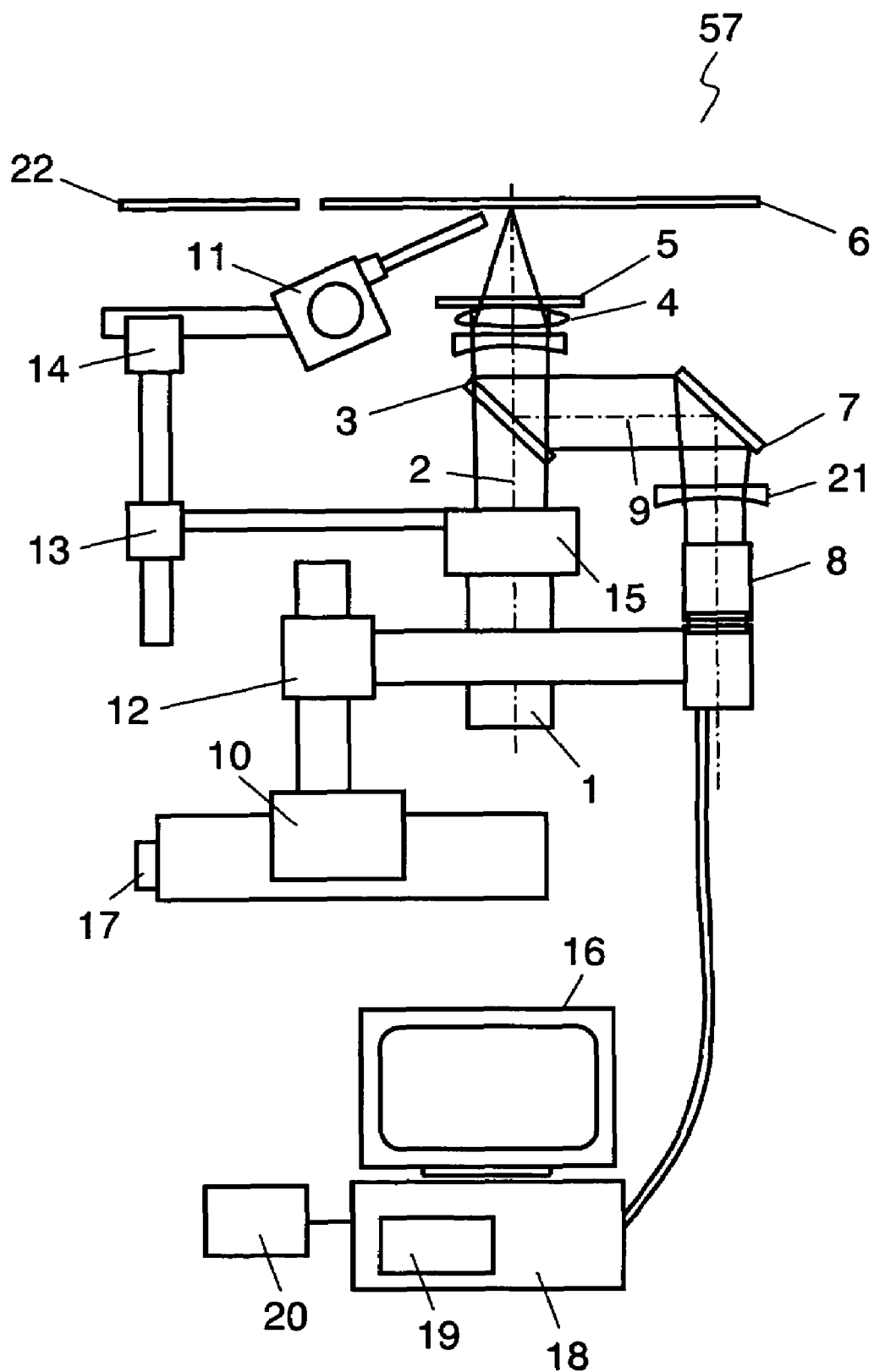
FIG. 7 is a schematic view of an optical processing apparatus according to Exemplary Embodiment 7 of the invention.

FIG. 7 is a schematic view of an optical processing apparatus 57 according to Exemplary Embodiment 7 of the present invention. As shown in FIG. 7, the components from the light energy emitter 1 to the corrector 21 in the processing head 41 are identical to those of the optical processing apparatus 56 of Embodiment 6 shown in FIG. 6 and will be described in no more detail. The optical processing apparatus 57 of Embodiment 7 further includes detectors 22 for detecting different colors to determine adhered matter.

An operation of the optical processing apparatus 57 will be explained.

The actuator 10 enables to change the relative position of the processing head 41 to the workpiece 6 and the detectors 22. As the processing head 41 has been moved to the detectors 22 by the actuator 10, the detectors detect an adhered matter on the protective glass 5 with optical receiver 8. If the adhered matter is not negligible, an operation of the optical processing apparatus 57 is stopped and an operator is demanded to carry out an action of maintaining the optical processing apparatus 57. While the optical processing apparatus 57 does not operate, the protective glass 5 is replaced by a new one. As the result, the workpiece 6 can be processed under normal conditions for soldering accurately, uniformly, and continuously.

The adhered matter can be detected at different states by the detectors 22. More specifically, if the color of the adhered matter is hardly detected by the color examiner 22 designed for detecting the same color as of the adhered matter, it can positively be identified with another color examiner 22 designed for detecting a different color. This allows the workpiece 6 to be processed with the protective glass 5 having no adhered matter thereon.

Exemplary Embodiment 8

Figure 8:
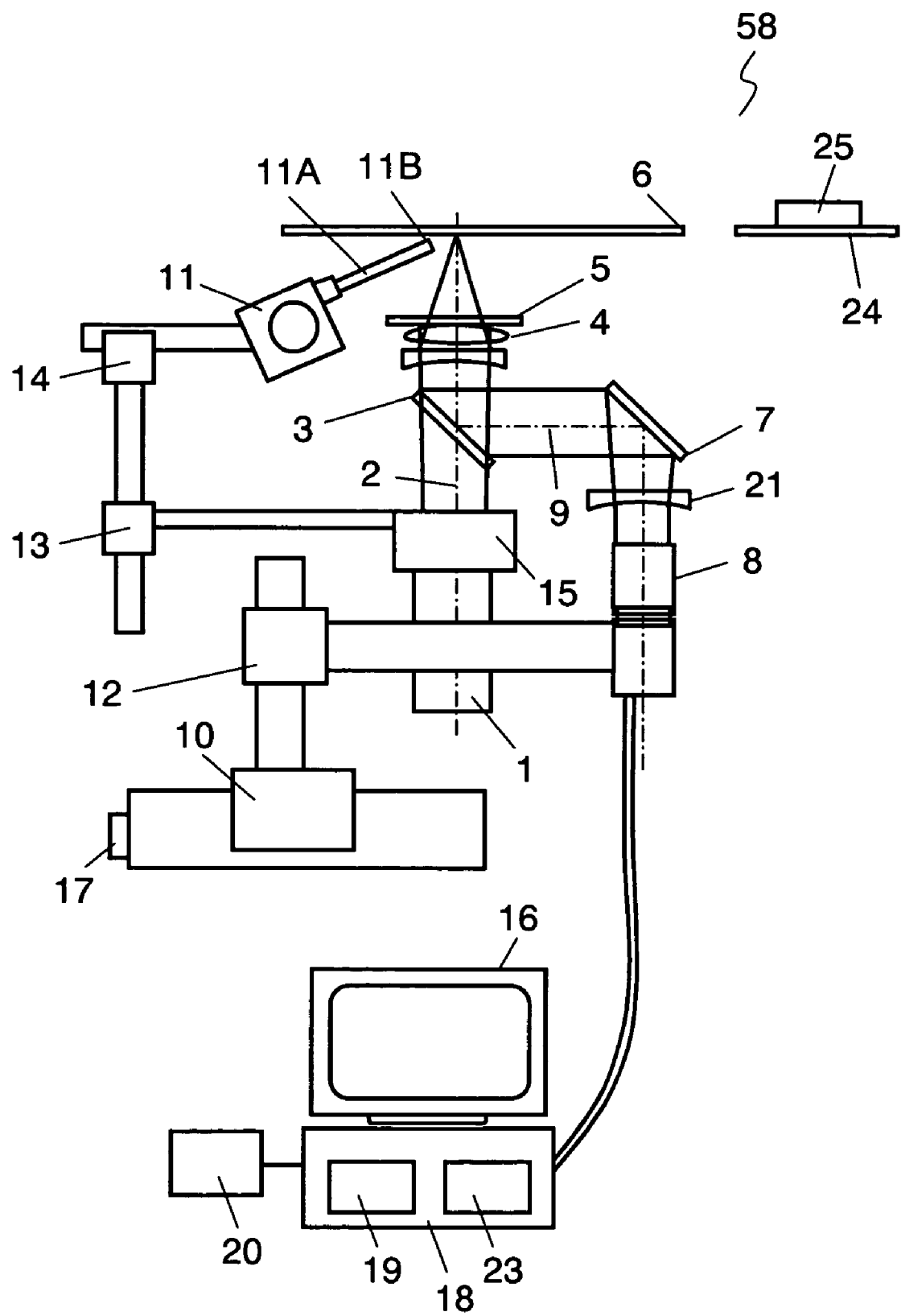
FIG. 8 is a schematic view of an optical processing apparatus according to Exemplary Embodiment 8 of the invention.

FIG. 8 is a schematic view of an optical processing apparatus 58 according to Exemplary Embodiment 8 of the present invention. As shown in FIG. 8, the components from the light energy emitter 1 to the corrector 21 in the processing head 41 are identical to those of the optical processing apparatus 56 of Embodiment 6 shown in FIG. 6 and will be described in no more detail. The optical processing apparatus 58 of Embodiment 8 further includes a detector 23 for detecting the shape of a distal end of a solder, a solder fuser 24 for fusing an unnecessary portion of the solder, and a heater 25 for heating the solder fuser 24.

An operation of the optical processing apparatus 58 will be explained.

The detector 23 detects the shape of the distal end 11B of a solder 11A. The heater 25 heats the solder fuser 24 for increasing the temperature of the solder 11A to a temperature higher than a melting point the solder. When it is judged that the shape of the solder 11A is not normal, the actuator 10 conveys the distal end 11B of the solder 11A towards the solder fuser 24 heated to the temperature higher than the melting point. As the solder 11A is introduced by the feeder 11, the distal end 11B presses directly against the solder fuser 24 to fuse the unnecessary portion of the solder 11A. The solder fuser 24 is preferably heated with the heater 25 prior to the conveying operation. This allows the distal end 11B of the solder 11A to have a desired shape, whereby the workpiece 6 can be soldered by the optical processing apparatus 58 accurately, uniformly, and continuously.

Exemplary Embodiment 9

Figure 9:
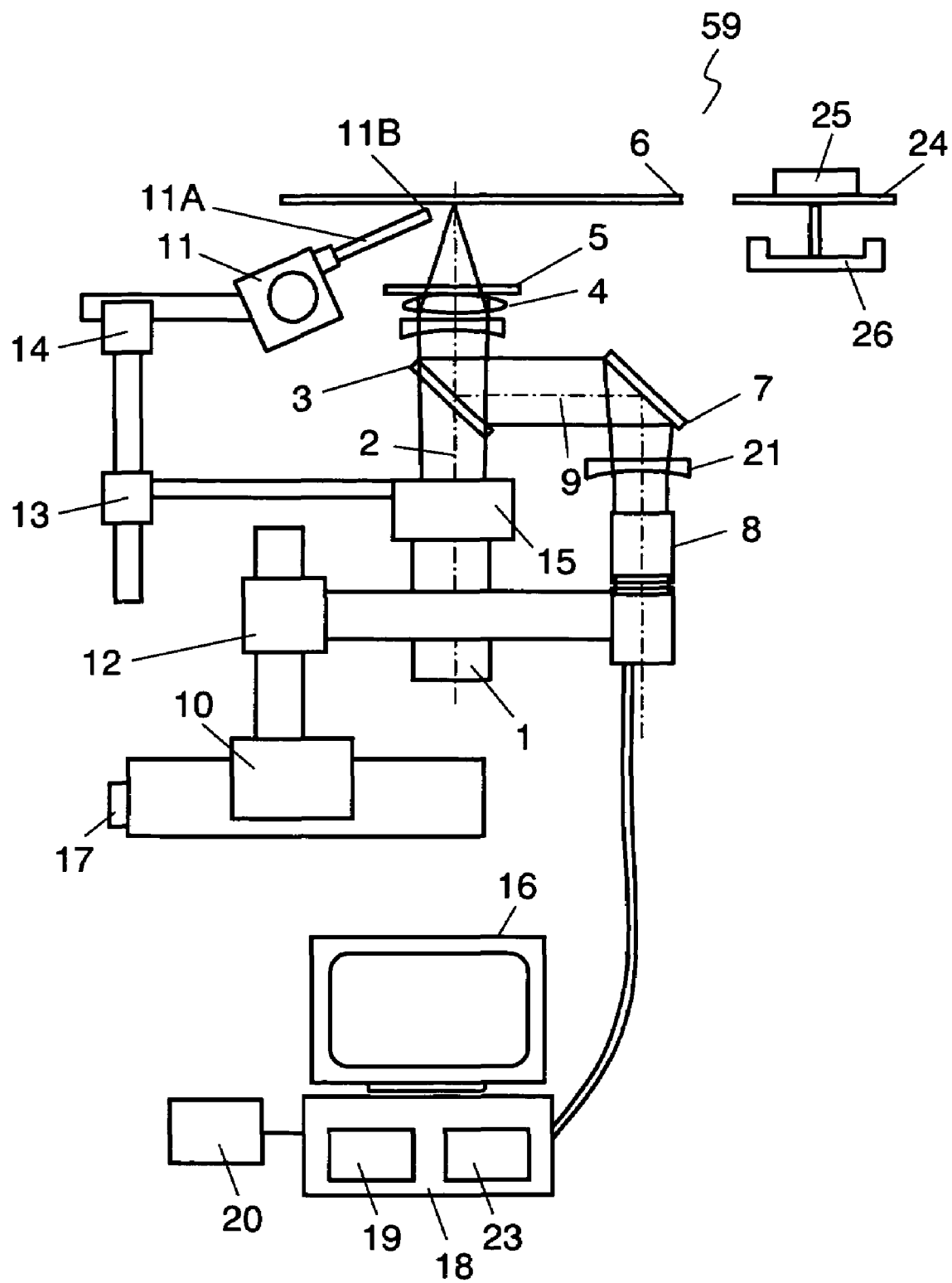
FIG. 9 is a schematic view of an optical processing apparatus according to Exemplary Embodiment 9 of the invention.

FIG. 9 is a schematic view of an optical processing apparatus 59 according to Exemplary Embodiment 9 of the present invention. As shown in FIG. 9, the components from the light energy emitter 1 to the heater 25 are identical to those of the optical processing apparatus 58 of Embodiment 8 shown in FIG. 8 and will be described in no more detail. The optical processing apparatus 59 of Embodiment 9 further includes a protector 26 provided perpendicularly beneath the solder fuser 24 for preventing an unnecessary portion of the solder from dropping down.

An operation of the optical processing apparatus 59 will be explained.

When a solder 11A is inadequate at the distal end 11B in the shape or particularly deformed and pressed against the solder fuser 24, the unnecessary portion may be fused down. As a result, the distal end 11B of the solder 11A may drop down. The distal end 11B, when dropping down, can however be received by the protector 26, and thus, the protective glass 5 is prevented from adhesion of solder. Accordingly, the optical processing apparatus 59 of this embodiment can solder a workpiece 6 accurately, uniformly, and continuously while properly separating between the distal end 11B of a solder 11A and any other component, such as the protective glass 5.

Exemplary Embodiment 10

Figure 10:
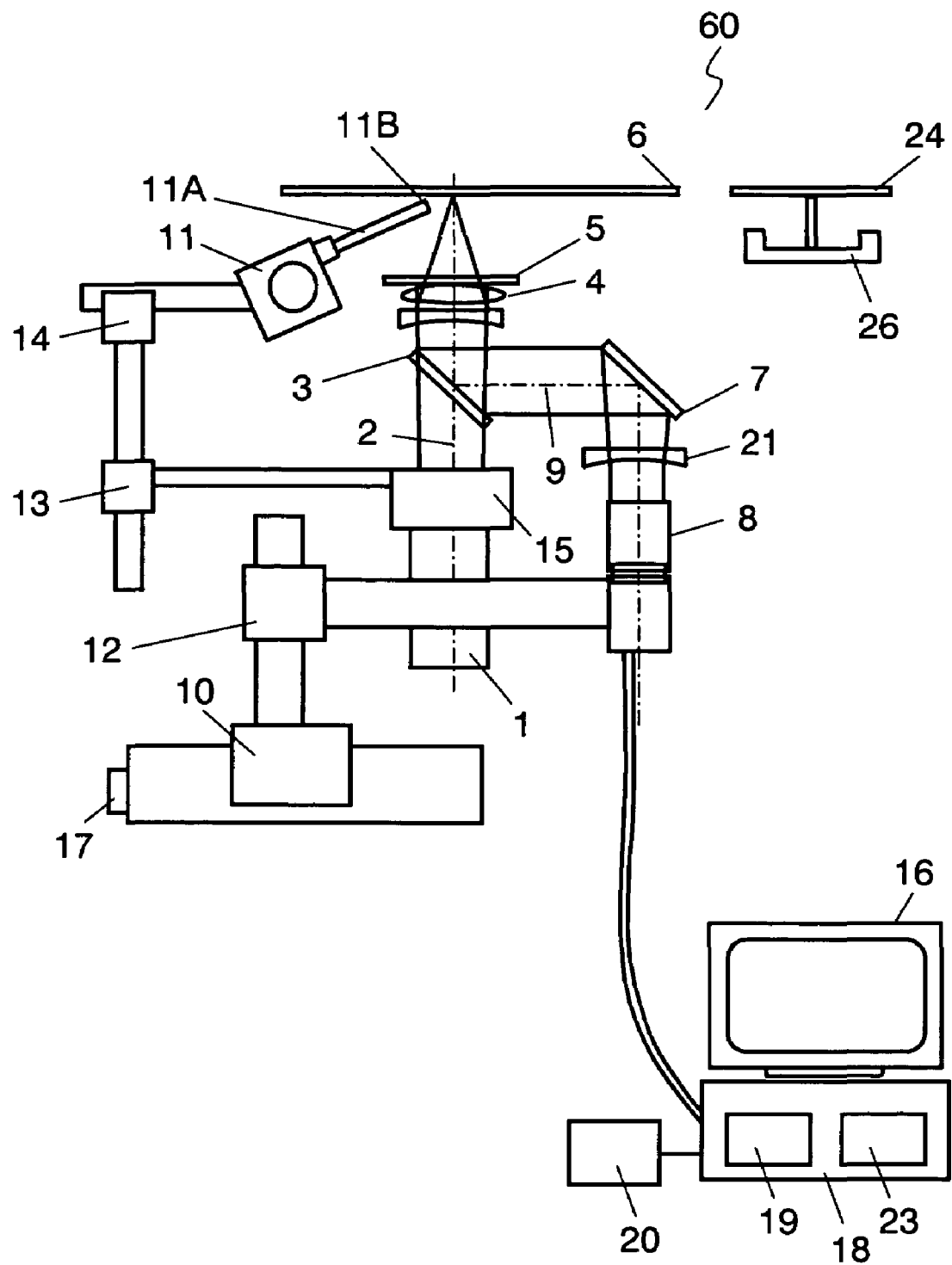
FIG. 10 is a schematic view of an optical processing apparatus according to Exemplary Embodiment 10 of the invention.

FIG. 10 is a schematic view of an optical processing apparatus 60 according to Exemplary Embodiment 10 of the present invention. As shown in FIG. 10, the components from the light energy emitter 1 to the protector 26 are identical to those of the optical processing apparatus 59 of Embodiment 9 shown in FIG. 9 and will be described in no more detail. The optical processing apparatus 60 of Embodiment 10 does not include the heater 25 for heating the solder fuser 25.

An operation of the optical processing apparatus 60 will be explained.

When the distal end 11B of a solder 11A is found defective, it is transferred to the solder fuser 24 by the actuator 10. Specifically, the solder fuser 24 is exposed to a beam of light emitted from the light energy emitter 1 and thus heated to a temperature higher than the fusing point of the solder 11A. As the solder 11A is supplied from the feeder 11 and pressed at the distal end 11B against the solder fuser 24, an unnecessary portion can be fused by the solder fuser 24. When the unnecessary portion or distal end 11B of the solder 11A is adhered to the solder fuser 24 or output downwardly, it can be intercepted by the protector 26 before reaching the protective glass 5, which thus remains free from adhesion of solder. Accordingly, the optical processing apparatus 60 of this embodiment can solder a workpiece 6 accurately, uniformly, and continuously while properly separating between the distal end 11B of a solder 11A and any other component, such as the protective glass 5.

The beam of light emitted from the light energy emitter 1 may be irradiated to any position on the solder fuser 24 because it is transferred by the effect of thermal conduction for fusing the solder. The protector 26 can easily be protected from exposure to the beam of light. The protector 26 made of light transmissive material can be inhibited from being affected by the heat of the light beam.

As described, the optical processing apparatus 60 has no heater required for heating the solder fuser 24 and can thus have reduced spatial limitations and be in expensive.

Exemplary Embodiment 11

Figure 11:
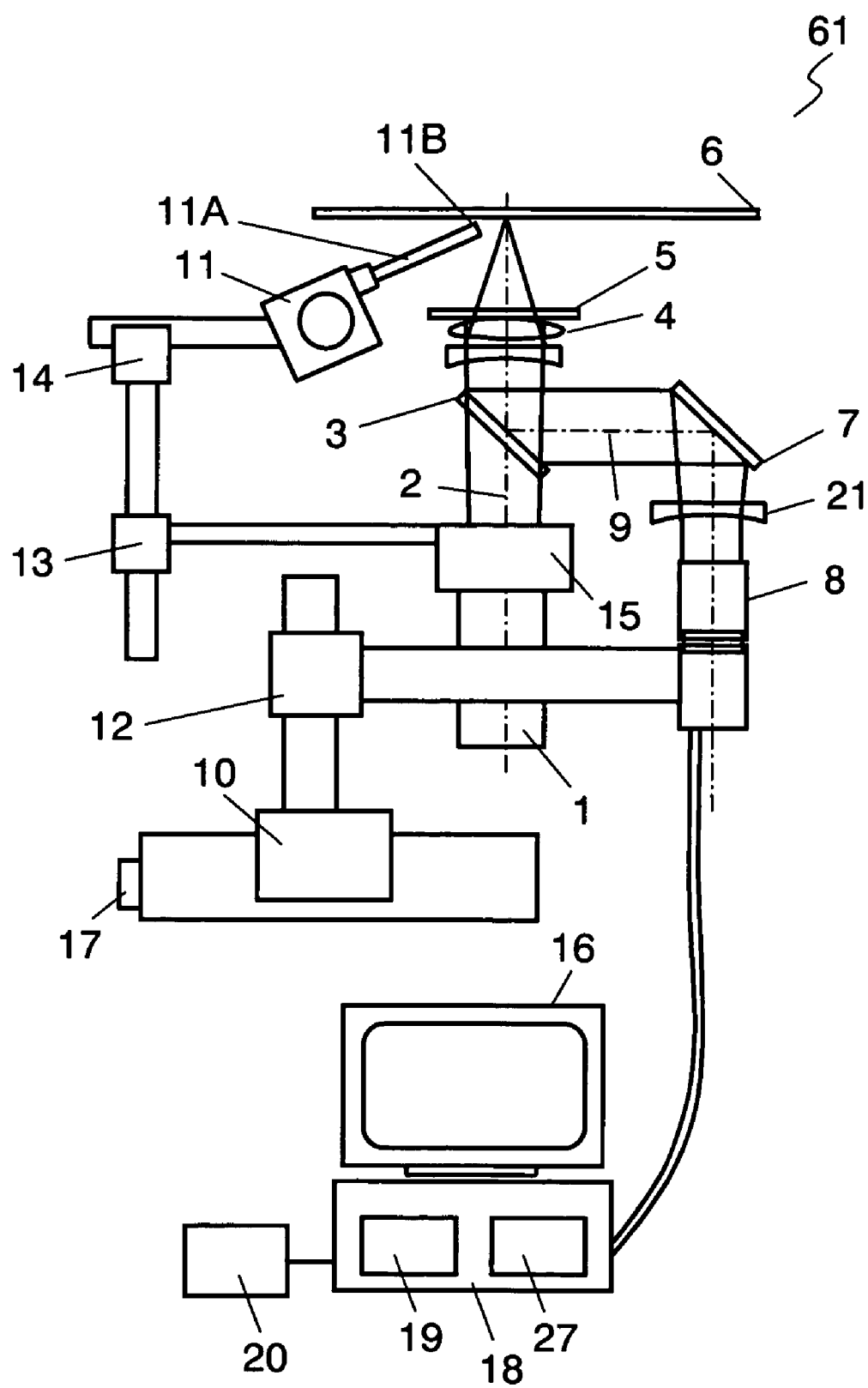
FIG. 11 is a schematic view of an optical processing apparatus according to Exemplary Embodiment 11 of the invention.

FIG. 11 is a schematic view of an optical processing apparatus 61 according to Exemplary Embodiment 11 of the present invention. As shown in FIG. 11, the components from the light energy emitter 1 to the corrector 21 are identical to those of the optical processing apparatus 56 of Embodiment 6 shown in FIG. 6 and will be described in no more detail. The optical processing apparatus 61 of Embodiment 11 further includes a detector 27 for detecting the position of the distal end 11B of a solder 11A.

An operation of the optical processing apparatus 61 will be explained.

When the distal end 11B of a solder 11A is not present on a workpiece 6, its absence is detected by the detector 27 which in turn cancels the action of the light processing apparatus 61 or actuates the feeder 11 for feeding the solder 11A to have a normal operating state. This prevents the workpiece 6 from being heated with no solder applied thereto. Accordingly, the optical processing apparatus 61 of this embodiment can perform the action of soldering a workpiece 6 accurately, uniformly, and continuously while providing the workpiece 6 with non of unwanted thermal stress.

Exemplary Embodiment 12

Figure 12:
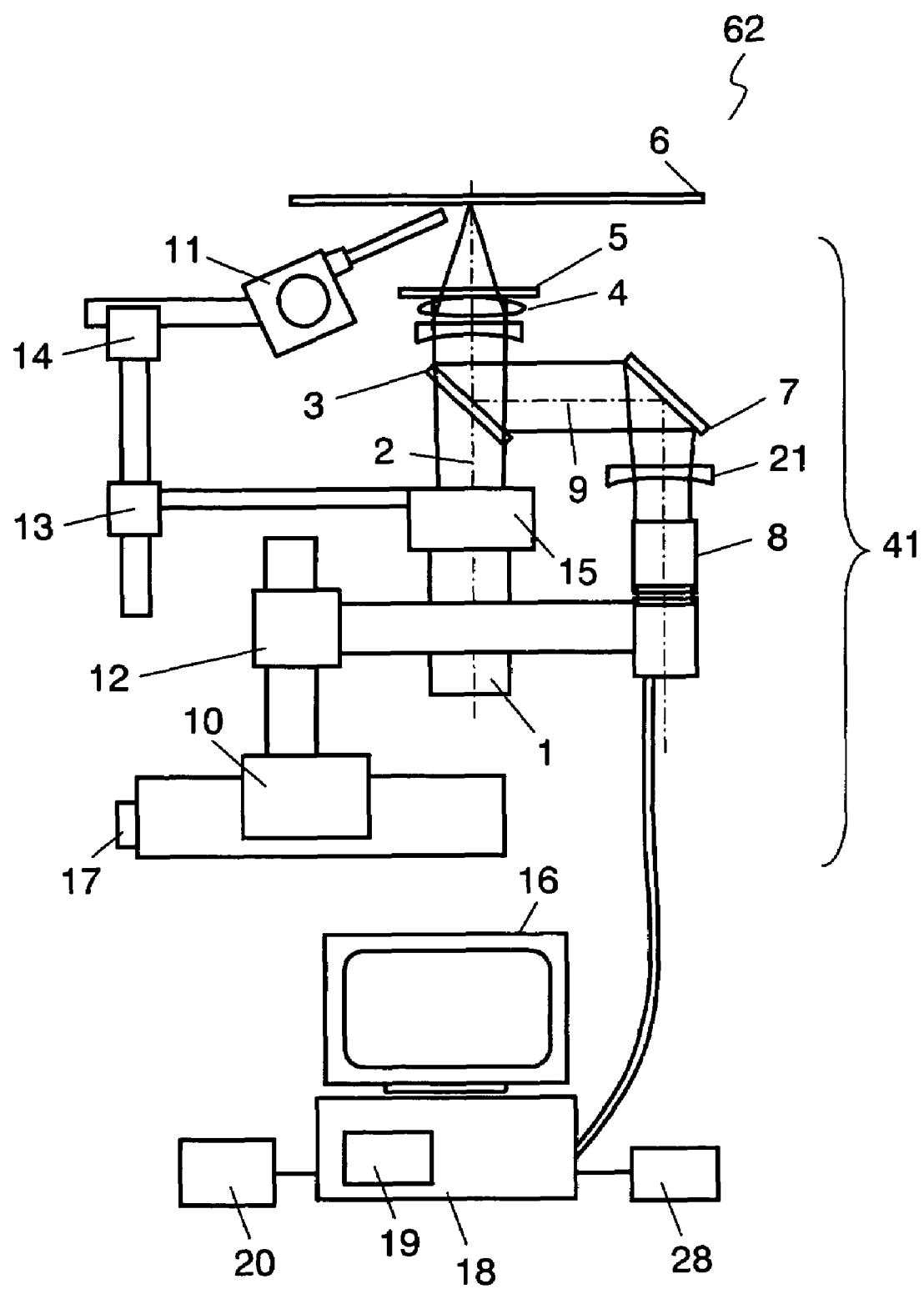
FIG. 12 is a schematic view of an optical processing apparatus according to Exemplary Embodiment 12 of the invention.

FIG. 12 is a schematic view of an optical processing apparatus 62 according to Exemplary Embodiment 12 of the present invention. As shown in FIG. 12, the components from the light energy emitter 1 to the corrector 21 are identical to those of the optical processing apparatus 56 of Embodiment 6 shown in FIG. 6 and will be described in no more detail. The optical processing apparatus 62 of Embodiment 12 further includes a memory 28 for storing a compensation amount for eliminating a deflection of the workpiece 6.

An operation of the optical processing apparatus 62 will be explained.

When it is found that the workpiece 6 is deflected, a compensation amount required at a processing point for eliminating a deflection is calculated and stored in the memory 28 by an operator. The shifters 12 to 15 are controlled in the movement according to the compensation amount stored in the memory 28, the optical processing apparatus 62 can determine a position and focusing on the workpiece 6 of the spot of the incident light from the optical system 4 in response to the deflection on the workpiece 6. Although the degree of deflection varies from one workpiece to another of the same type, no reference data needs to be repeatedly registered but the compensation amount stored in the memory 28 can be modified, thus allowing the workpiece 6 to be processed at high quality. Also, the compensation amount may need to be registered for not all the positions to be processed but fault positions on the workpiece 6 where the deflection exceeds its limit. The compensation amount can be calculated while an image on the display 16 is monitored. Accordingly, the optical processing apparatus 62 of this embodiment can solder the workpiece 6 accurately, uniformly, and continuously even if the workpiece 6 is deflected.

Exemplary Embodiment 13

Figure 13:
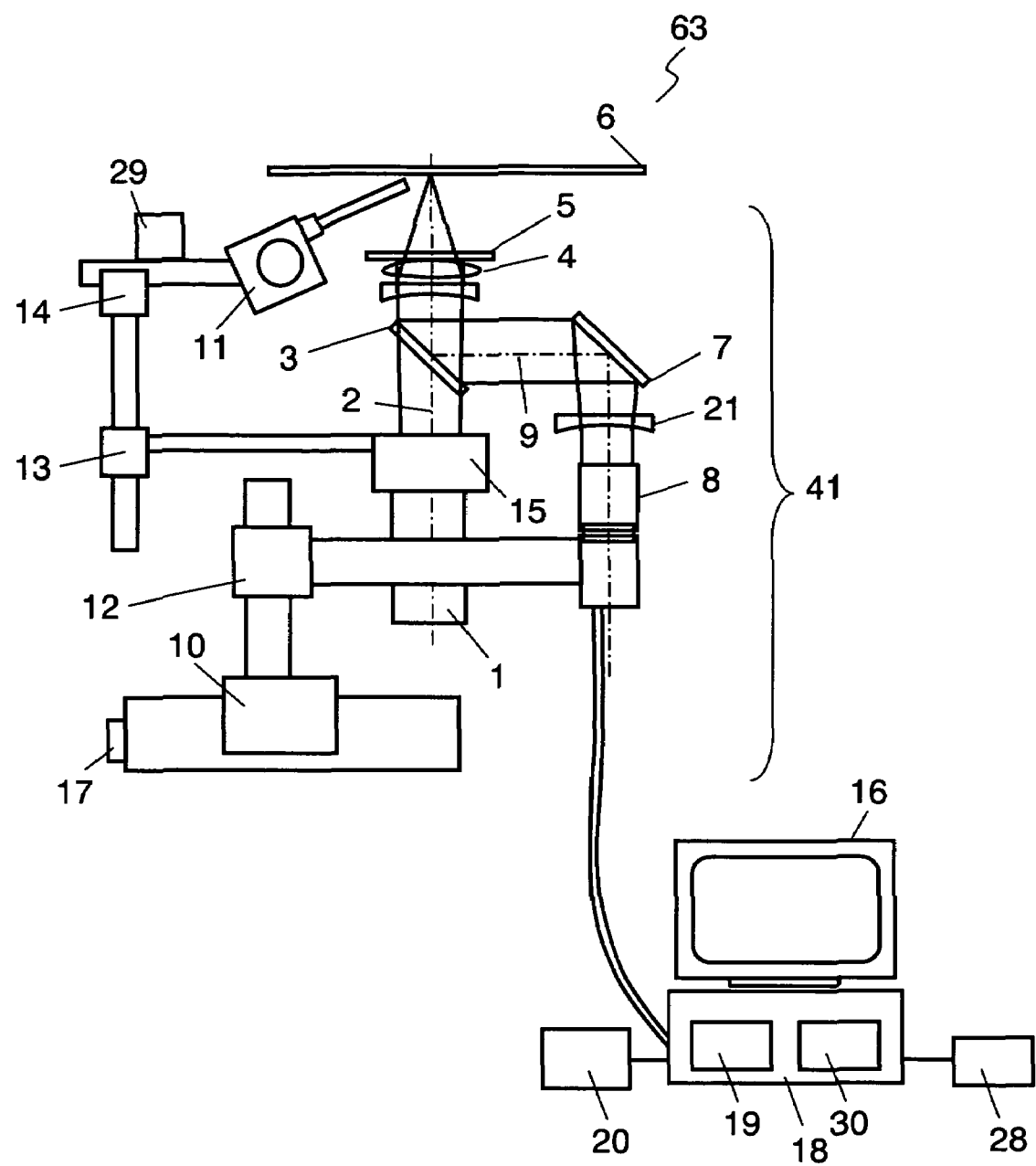
FIG. 13 is a schematic view of an optical processing apparatus according to Exemplary Embodiment 13 of the invention.

FIG. 13 is a schematic view of an optical processing apparatus 63 according to exemplary Embodiment 13 of the present invention. As shown in FIG. 13, the components from the light energy emitter 1 to the corrector 21 and the memory 28 are identical to those of the optical processing apparatus 62 of Embodiment 12 shown in FIG. 12 and will be described in no more detail. The optical processing apparatus 63 of Embodiment 13 further includes a detector 29 for measuring a deflection of a workpiece 6 and a calculator 30 for calculating a compensation amount from the deflection.

An operation of the optical processing apparatus 63 will be explained.

Prior to a processing operation, the processing head 41 is moved by the actuator 10 and each deflection on a workpiece 6 is measured. A compensation amount required at the position on the workpiece 6 for exposure to the incident light is calculated from the deflection and position data by the calculator 30 and is stored in the memory 28 for registration. The compensation amount stored in the memory 28 can then be used for controlling the movement of the shifters 12 to 15, hence allowing the optical processing apparatus 63 to determine the position and focusing of the spot of the incident light from the optical system 4 and process the workpiece 6 in response to the deflection on the workpiece 6. Since the compensation amount is automatically measured, it needs not to be registered repeatedly at each deflection on the workpiece 6. This will eliminate measuring or registering error by the operator. The compensation amount may need to be registered for not all the positions to be processed but fault positions on the workpiece 6 where the deflection exceeds its limit. In the optical processing apparatus 63, the compensation amount can be calculated while an image on the display 16 is monitored. Accordingly, the optical processing apparatus 62 of this embodiment can solder the workpiece 6 accurately, uniformly, and continuously even if the workpiece 6 is unfavorably deflected.

Exemplary Embodiment 14

Figure 14:
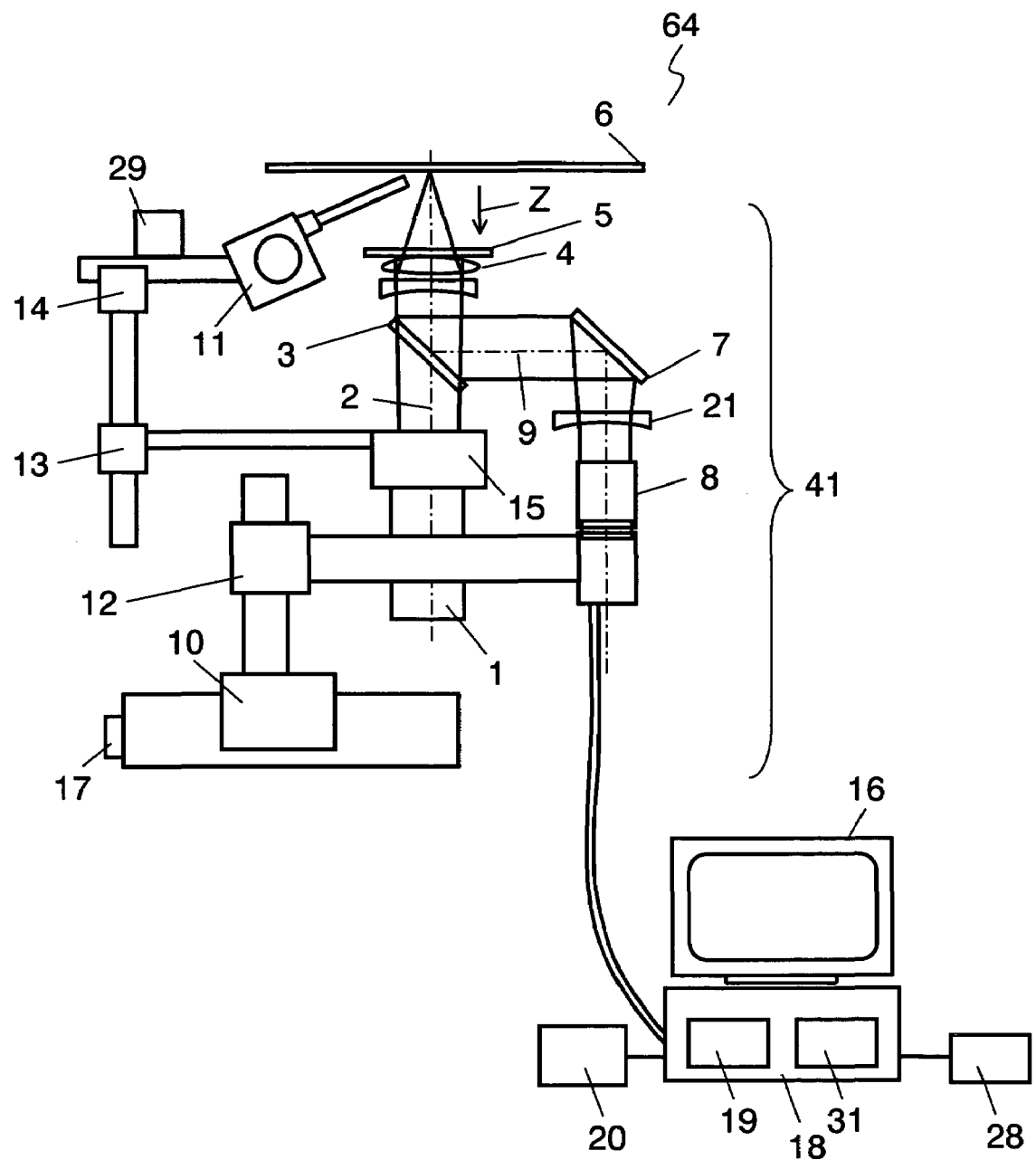
FIG. 14 is a schematic view of an optical processing apparatus according to Exemplary Embodiment 14 of the invention.

FIG. 14 is a schematic view of an optical processing apparatus 64 according to Exemplary Embodiment 14 of the present invention. As shown in FIG. 14, the components from the light energy emitter 1 to the corrector 21, the memory 28, and the detector 29 in the processing head 41 are identical to those of the optical processing apparatus 63 of Embodiment 13 shown in FIG. 13 and will be described in no more detail. The optical processing apparatus 64 of Embodiment 14 further includes a calculator 31 for calculating a compensation amount to eliminate a deflection at any desired position on the workpiece 6.

An operation of the optical processing apparatus 64 will now be explained.

Prior to the processing operation, the processing head 41 is moved by the actuator 10 and the deflection at a mark point on a workpiece 6 is measured. The calculator 31 then calculates deflections at three different positions closely about the mark point from the measurement of the deflection at the mark point and the data of the position to be processed. Then, the calculator 31 determine a plane where the three different positions exist from the deflections at the three different positions and calculates the intersection between the plane and the line which extends from the position to be processed along a Z axis. A difference between the intersection and the position to be processed is then qualified as the compensation amount. The compensation-amount is stored in the memory 28 for registration. The compensation amount stored in the memory 28 can then be used for controlling the movement of the shifters 12 to 15, hence allowing the optical processing apparatus 64 to determine the position and focusing of the spot of the incident light from the optical system 4 and process the workpiece 6 in response to the deflection of the workpiece 6. Since the compensation amount is automatically measured, it needs not to be registered repeatedly at each deflection on the workpiece 6. This eliminates measuring or registering error by the operator. The compensation amount may need to be registered for not all the positions to be processed but fault positions on the workpiece 6 where the deflection exceeds its limit. The deflection can be measured at any available mark point on the workpiece 6. Even when the deflection at the position to be processed fails to be measured, the compensation amount for eliminating the deflection at the position to be processed can easily be calculated from the deflection at the mark point. Accordingly, the optical processing apparatus 64 of this embodiment can solder the workpiece 6 accurately, uniformly, and continuously even if the workpiece 6 is deflected.

The setting, and the measuring method for the optical processing apparatuses 61 to 64 of Embodiments 1 to 14 are not limited to those explained above.

Exemplary Embodiment 15

Figure 15:
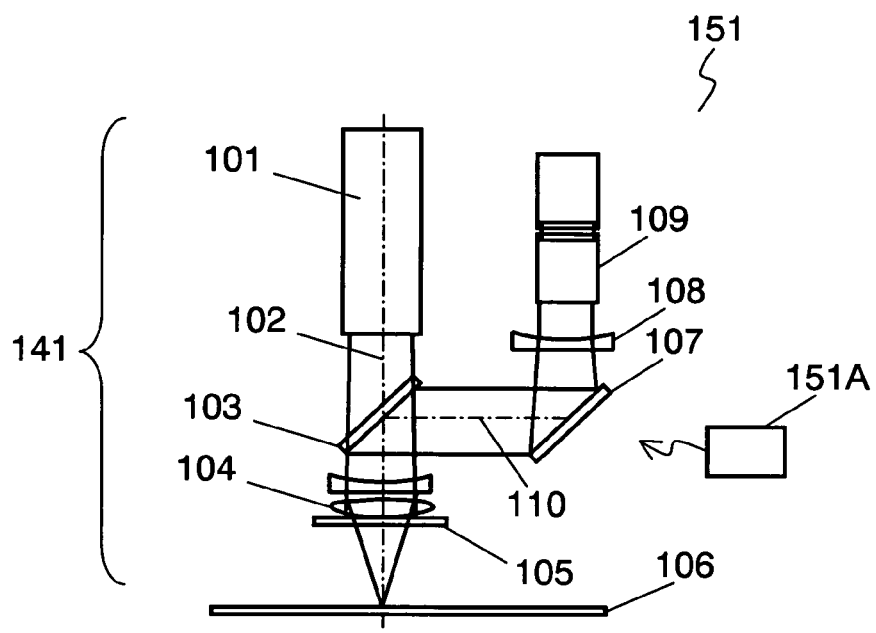
FIG. 15 is a schematic view of an optical processing apparatus according to Exemplary Embodiment 15 of the invention.

FIG. 15 is a schematic view of an optical processing apparatus 151 according to exemplary Embodiment 15 of the present invention. A light energy emitter 101 emits laser beam having a light energy. The laser beam from the light energy emitter 101 is dispersed at a predetermined dispersion angle and directed along a light path 102 to a workpiece 106. A half mirror 103 reflects a visible component of the light and allows the other to pass. An optical system 104 including lenses has light collecting characteristics for shaping or focusing the light to a desired size of light spot in response to a degree of the dispersion. A detachable protective glass 105 protects the optical system 104 from being fouled with impurities generated during the processing operation. If the protective glass 105 is fouled with impurities, the energy of light output from the optical system 104 declines. After the protective glass 105 is replaced by a new one, the output from the optical system 104 returns to its desired level. This allows the optical processing apparatus 151 to be maintained easily. A mirror 107 directs the light reflected from the workpiece 106 to an optical receiver 109, such as a camera. A corrector 108 corrects a distortion of an image resulting from the shaping operation of the optical system 104. The light is transferred from the half mirror 103 to the optical receiver 109 along a light path 110.

An operation of the optical processing apparatus 151 will be explained.

The light emitted from the light energy emitter 101 is transmitted along the light path 102 to the half mirror 103, collected to a desired diameter of the spot by the optical system 104, passes through the protective glass 105, and reaches the workpiece 106. The workpiece 106 is processed with the focused light. As the focused light is radiated on a local point to be processed on the workpiece 106, its heating effect can hardly propagate throughout the workpiece 106.

Light reflected from the workpiece 106 returns back through the protective glass 105 and the optical system 104, and is reflected by the half mirror 103. The light then passes along the light path 110, is reflected again by the mirror 107, and is directed to the corrector 108 before entering the optical receiver 109. The light energy emitter 101, the light path 102, the half mirror 103, the optical system 104, the protective glass 105, the mirror 107, the corrector 108, the optical receiver 109, and the light path 110 form a processing head 141.

Figure 21:
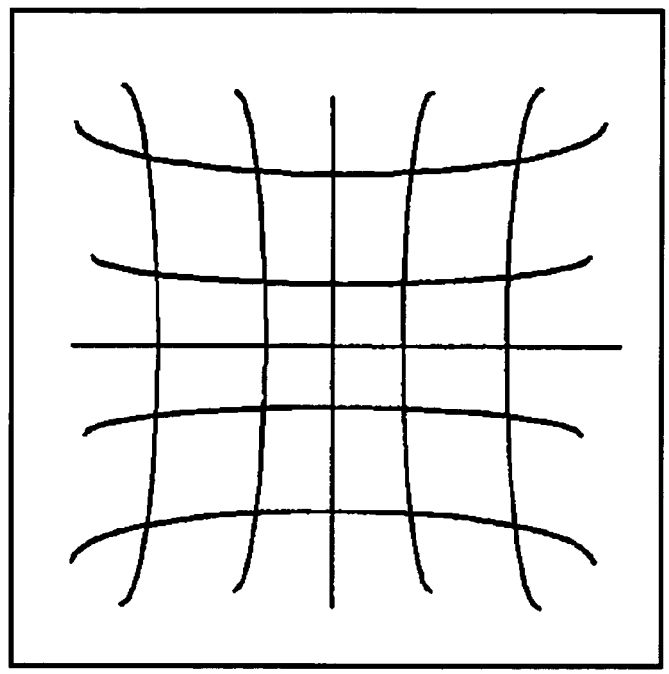
FIG. 21 illustrates an image received by a corrector of the optical processing apparatus according to Exemplary Embodiments 15 to 21.

FIG. 21 illustrates a distorted image of the workpiece 106 output from the optical system 104 and received by the corrector 108. The light emitted from the light energy emitter 101 is dispersed at the predetermined dispersion angle and speared in proportion to the distance from the emitter 101. The optical system 104 has optical characteristics for shaping the light to a desired diameter of the spot. The light reflected from the workpiece 106 may however be distorted in radial directions from the center of the image by the optical characteristic of the optical system 104.

Figure 22:
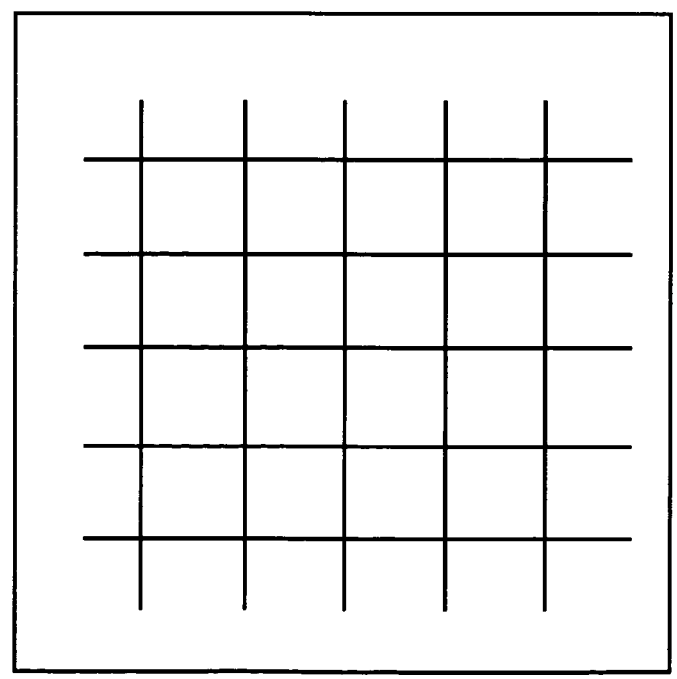
FIG. 22 illustrates an image output from the corrector of the optical processing apparatus according to Exemplary Embodiments 15 to 21.

The corrector 108 corrects the distorted image and provides the optical receiver 109 with the corrected image of the workpiece 106 which has no distortion. FIG. 22 illustrates the image of the workpiece 106 corrected from the image shown in FIG. 21. Accordingly, the optical processing apparatus 151 of this embodiment can readily identify any distortion at the position to be processed and the size of the spot of the light on the workpiece 106, thus reducing the duration for instructing a controller 151A and processing the workpiece 106 accurately.

Exemplary Embodiment 16

Figure 16:
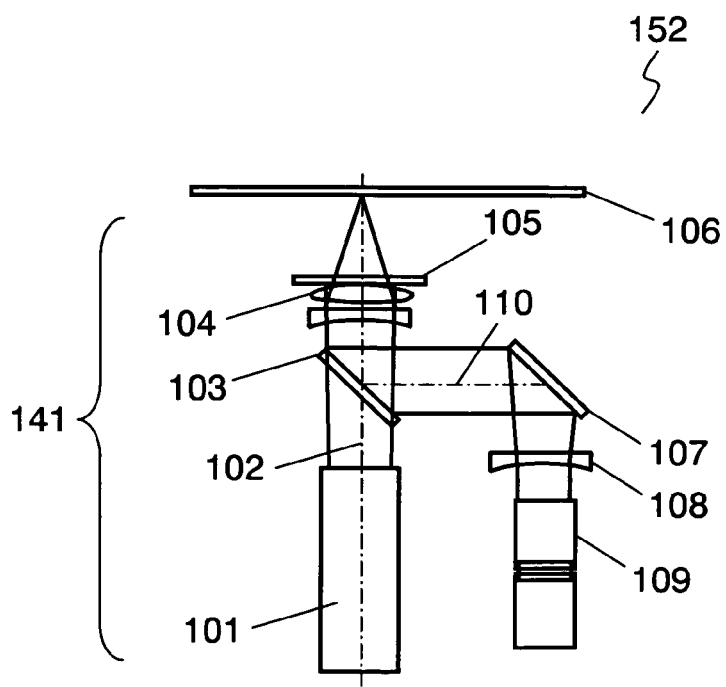
FIG. 16 is a schematic view of an optical processing apparatus according to Exemplary Embodiment 16 of the invention.

FIG. 16 is a schematic view of an optical processing apparatus 152 according to Exemplary Embodiment 16 of the present invention. A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 shown in FIG. 15 and will be explained in no more detail. The optical processing apparatus 152 of Embodiment 16 includes the processing head 141 provided at the lower side of a workpiece 161 where the gravity acts vertically.

An operation of the optical processing apparatus 152 will be explained.

The light emitted from the light energy emitter 101 and light reflected on the workpiece 106 pass, shaped, corrected, and used for processing the workpiece 106 similarly to the light path as of the optical processing apparatus 151 of Embodiment 15 shown in FIG. 15. Since the processing head 141 is located vertically beneath the workpiece 106, it can readily process a lower side of the workpiece 106. The optical processing apparatus 152 requires no extra device for turning the workpiece 106 upside down before processing the lower side of the workpiece 106. Accordingly, the optical processing apparatus 152 of this embodiment can eliminate any displacement of the position to be processed on the workpiece 106 which results from the turning upside down as well as falling down of the workpiece 106 itself or any component mounted on the workpiece 106.

Exemplary Embodiment 17

Figure 17:
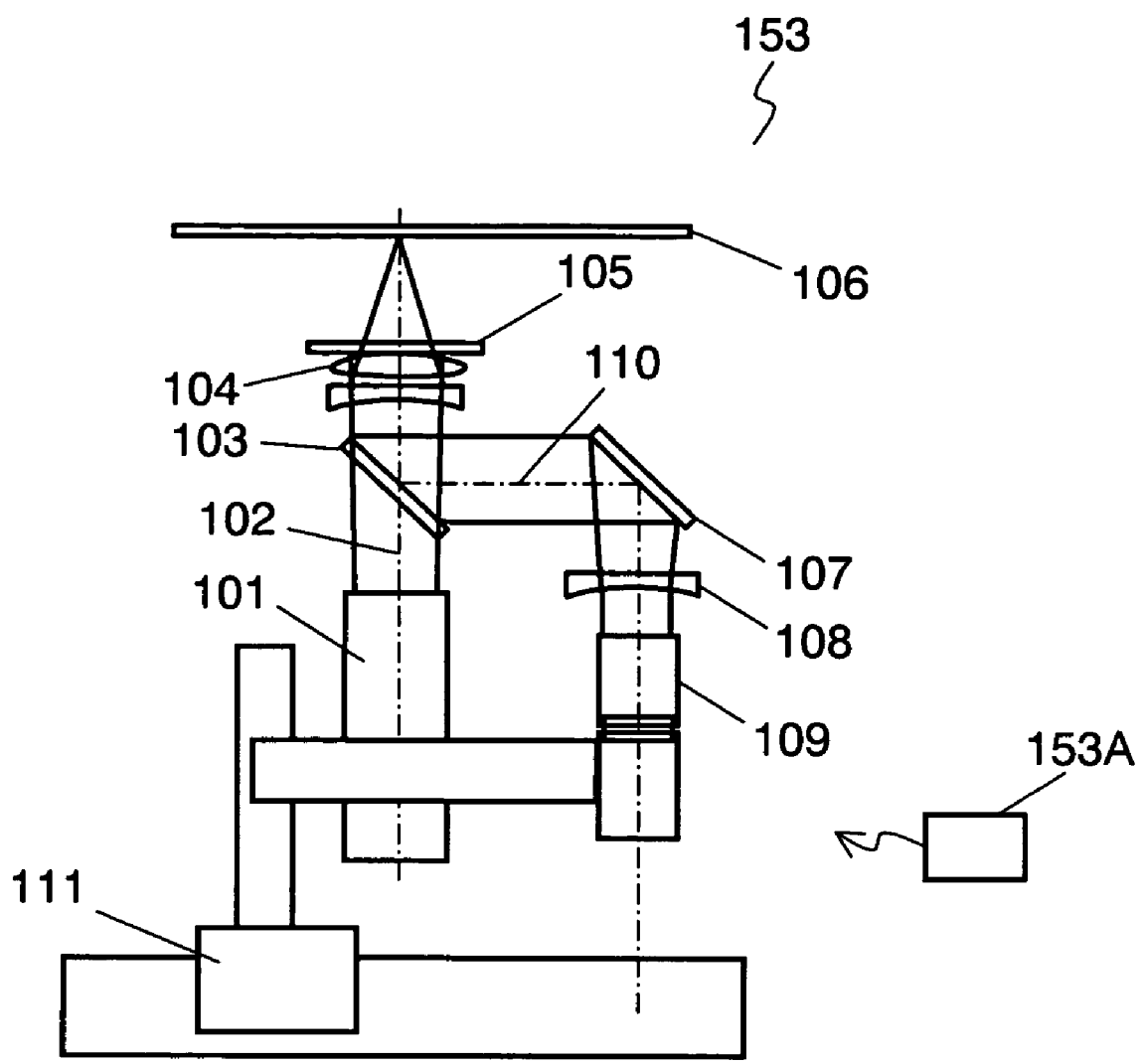
FIG. 17 is a schematic view of an optical processing apparatus according to Exemplary Embodiment 17 of the invention.

FIG. 17 is a schematic view of an optical processing apparatus 153 according to Exemplary Embodiment 17 of the present invention. A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 of the foregoing embodiment shown in FIG. 15 and will be explained in no more detail. The processing head 141 is located at the lower side of a workpiece 106 where the gravity acts vertically, thus allowing the workpiece 106 to be processed from the lower side. An actuator 111 changes the positional relationship between the optical system 104 and the workpiece 106.

An operation of the optical processing apparatus 153 will be explained.

As the processing head 141 is moved by the actuator 111 in response to an image of the position to be processed which is supplied from the optical receiver 109, the light is radiated on and processes the position to be processed on the workpiece 6.

Accordingly, any desired position on the workpiece 106 can be processed.

Exemplary Embodiment 18

Figure 18:
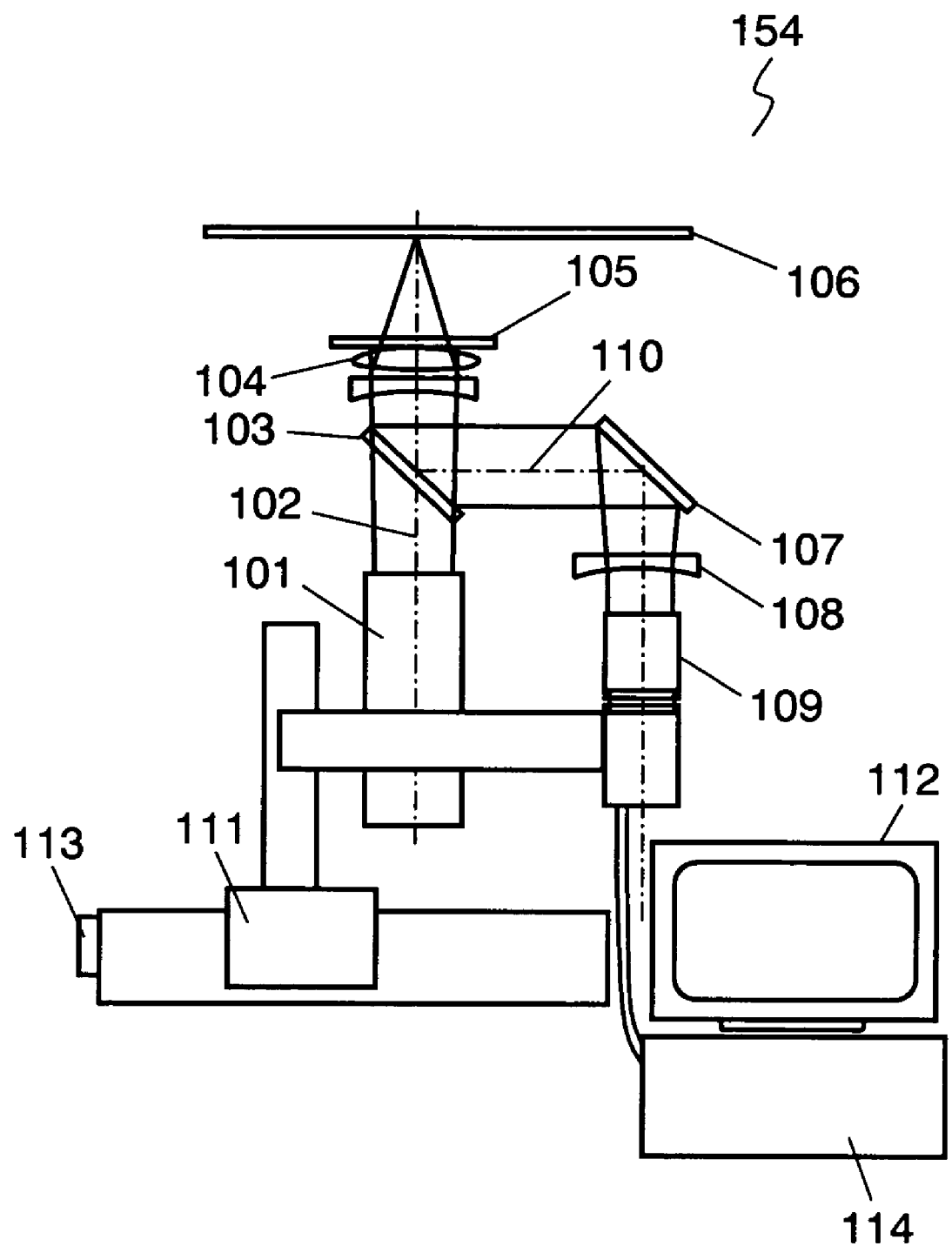
FIG. 18 is a schematic view of an optical processing apparatus according to Exemplary Embodiments 18 and 19 of the invention.

FIG. 18 is a schematic view of an optical processing apparatus 154 according to Exemplary Embodiment 18 of the present invention. A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 of the foregoing embodiment shown in FIG. 15 and will be explained in no more detail. The processing head 141 is located vertically beneath a workpiece 106.

An actuator 111 changes the positional relationship between the optical system 104 and the workpiece 106. An image of the workpiece 106 is captured by the optical receiver 109 and displayed on a display 112, such as a CRT or LCD display. An identifier 113 detects the position of the processing head 141. Also, the spot of the light on the workpiece 106 is detected by a detector 114.

An operation of the optical processing apparatus 154 will be explained.

Upon receiving the position of the processing head 141 identified by the identifier 113, the detector 114, such as a computer, determines the position of the spot of the incident light output from the processing head 141. Data of the position is then transferred to the display 112. The image of the workpiece 106 is converted into an electrical signal by the optical receiver 109 and displayed on the display 112 to show an image of the position to be processed overlapping with the position of the spot of the light on the workpiece 106.

This allows the position to be processed on the workpiece to be monitored easily even if the position is small or invisible at the lower side of the workpiece. Accordingly, the position to be processed on the workpiece, even when being dislocated, can readily be identified is corrected and transferred to a controller 154A for controlling an operation of the optical processing apparatus 154.

Exemplary Embodiment 19

FIG. 18 is a schematic view of an optical processing apparatus 154 according to Exemplary Embodiment 19 of the present invention.

A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 of the foregoing embodiment shown in FIG. 15 and will be explained in no more detail. The processing head 141 is located vertically beneath a workpiece 106.

An actuator 111 changes the positional relationship between the optical system 104 and the workpiece 106. An image of the workpiece 106 is captured by the optical receiver 109 and displayed on a display 112. An identifier 113, such as an encoder of the actuator 111, detects the position of the processing head 141. Also, the spot of the incident light output from the optical system 104 can be detected by a detector 114. A corrector 115, such as an image recognition device, calculates a difference between the position to be processed and the position of the spot of the incident light.

An operation of the optical processing apparatus 154 will be explained.

Upon receiving the position of the processing head 141 identified by the identifier 113, the detector 114 determines the position of the spot of the incident light output from the processing head 141. The data of the position is then transferred to the display 112. An optical image of the workpiece 106 is converted into an electrical signal by the optical receiver 109 and displayed on the display 112 to show an image of the position to be processed overlapping with the position of the spot of the incident light on the workpiece 106.

The corrector 115 calculates a difference between the position to be processed on the workpiece 106 received from the optical receiver 109 and the position of the spot of the incident light output from the processing head 141 and transfers it to the detector 114. In response, the detector 114 instructs the actuator 111 to move the processing head 141 for eliminating the difference and the processing of the workpiece 106 with the incident light from the processing head 141 can follow. Since the difference between the position to be processed and the position of the spot of the incident light on the workpiece 106 is eliminated through the action of the actuator 111, the processing of the workpiece 106 can be carried out accurately.

Exemplary Embodiment 20

Figure 19:
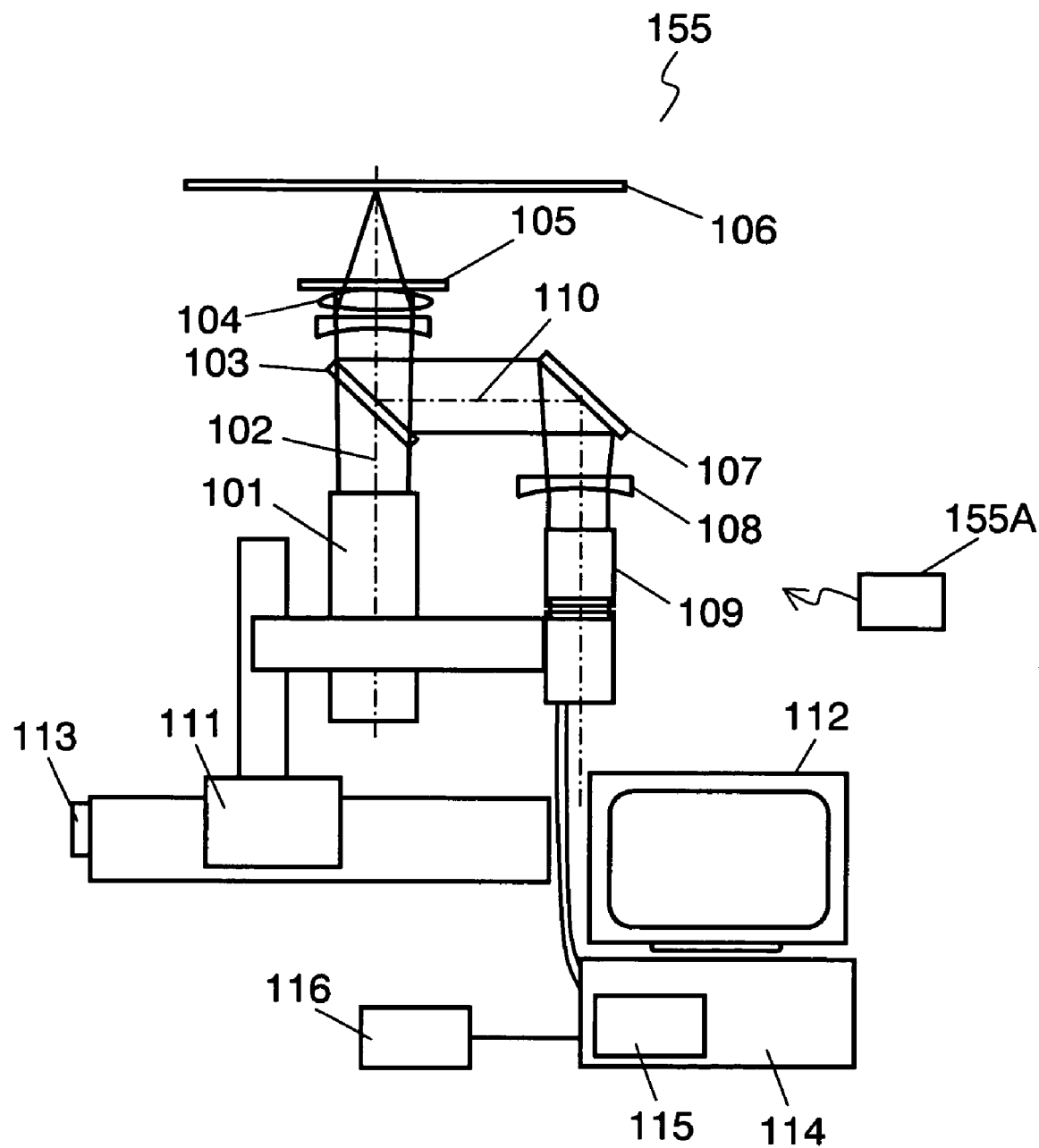
FIG. 19 is a schematic view of an optical processing apparatus according to Exemplary Embodiment 20 of the invention.

FIG. 19 is a schematic view of an optical processing apparatus 155 according to Exemplary Embodiment 20 of the present invention.

A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 of the foregoing embodiment shown in FIG. 15 and will be explained in no more detail. The processing head 141 is located vertically beneath a workpiece 106.

An actuator 111 changes the positional relationship between the optical system 104 and the workpiece 106. An image of the workpiece 106 is captured by the optical receiver 109 and displayed on a display 112. An identifier 113 detects the position of the processing head 141.

An operation of the optical processing apparatus 155 will be explained.

Upon receiving the position of the processing head 141 identified by the identifier 113, the detector 114 determines the position of the spot of the incident light output from the processing head 141. Data of the position is then transferred to the display 112. An optical image of the workpiece 106 is converted into an electrical signal by the optical receiver 109 and displayed on the display 112 to show an image of the position to be processed on the workpiece 106 overlapping with the position of the spot of the incident light.

The image of the workpiece 106 is stored as CAD data, a scanner image, or a camera image in the memory 116, such as a magnetic disk or a flash memory. The memory 116 allows the image to be displayed on the display 112. The position of the spot of the incident light detected by the detector 114 is also displayed on the display 112 to overlap with the image of the workpiece 106.

Since the image of the workpiece 106 and the position of the spot of the incident light are displayed simultaneously on the display 112, the positional relationship between the spot of the incident light on the workpiece 106 and the position to be processed on the workpiece 106 can easily be obtained. Also, the memory 116 permits an operator to instruct at off line a controller 155A for controlling an operation of the optical processing apparatus 155 with the position to be processed while monitoring the image of the workpiece 6 without interrupting an operation of the production line.

Exemplary Embodiment 21

Figure 20:
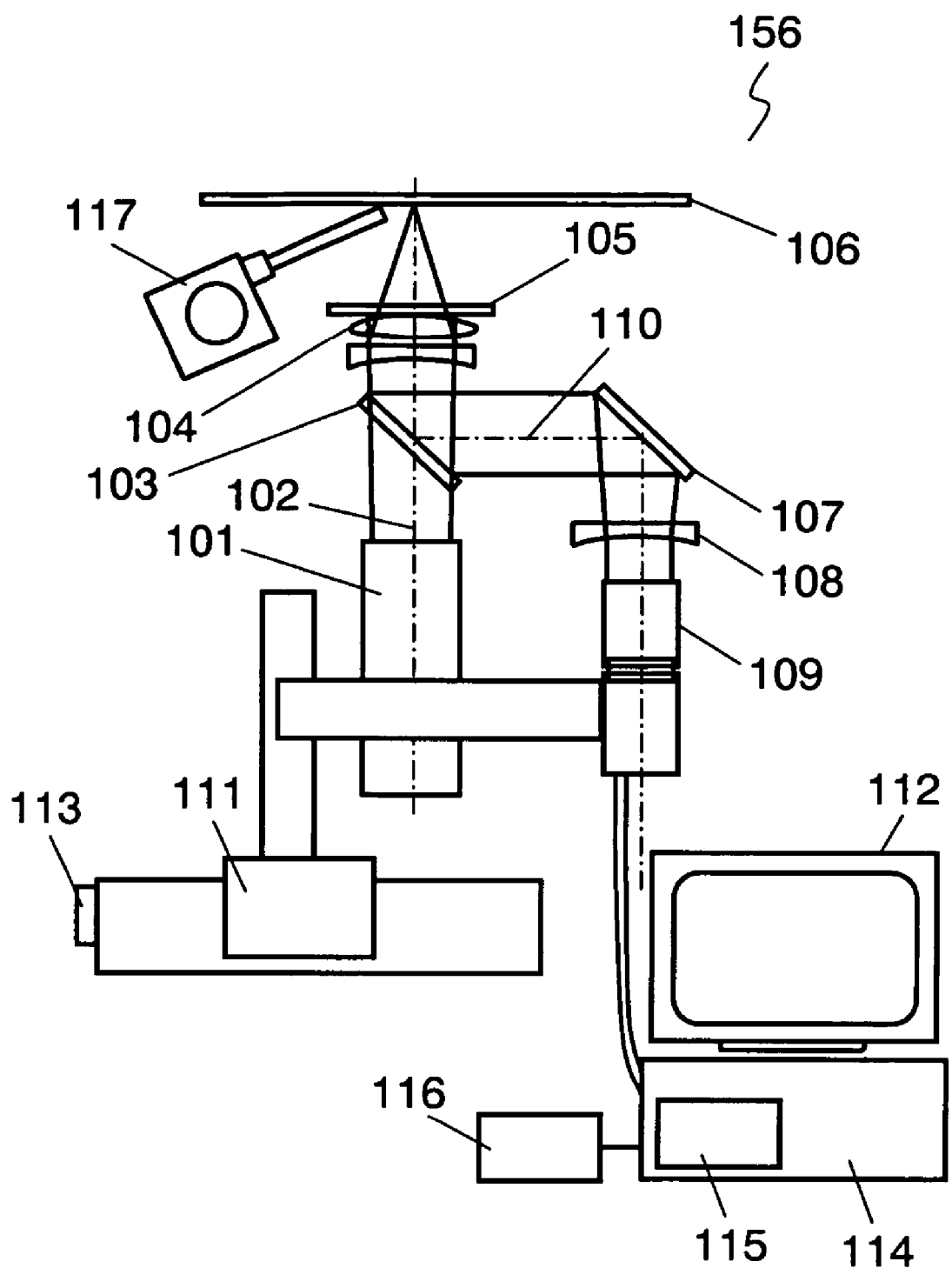
FIG. 20 is a schematic view of an optical processing apparatus according to Exemplary Embodiment 21 of the invention.

FIG. 20 is a schematic view of an optical processing apparatus 156 according to Exemplary Embodiment 21 of the present invention.

A processing head 141 including the light energy emitter 101, the light path 102, the half mirror 103, the optical system 104, the protective glass 105, the mirror 107, the corrector 108, the optical receiver 109, and the light path 110 is identical in the arrangement to the processing head 141 of the foregoing embodiment shown in FIG. 15 and will be explained in no more detail. The processing head 141 is located beneath and perpendicular to a workpiece 106.

An actuator 111 changes the positional relationship between the optical system 104 and the workpiece 106. An image of the workpiece 106 is captured by the optical receiver 109 and displayed on a display 112. An identifier 113 detects the position of the processing head 141.

An operation of the optical processing apparatus 156 will be explained.

The detector 114 instructs the actuator 111 to move the processing head 141 for directing the spot of the incident light from the processing head 141 to the position to be processed on the workpiece 106. This allows the workpiece 106 to be exposed to the light from the processing head 141. At this moment, the feeder 117 introduces a solder to the position on the workpiece 106 heated by the light for soldering.

The corrector 108 in any of Embodiments 15 to 21 may be provided with each of the optical processing apparatuses 51 to 64 of Embodiments 1 to 14. Since the corrector 108 for correcting a distortion in the image of a workpiece 106 which has been produced by the optical system 4 is located between the half mirror 3 and the optical receiver 8, the same effect as of Embodiments 15 to 21 can be ensured.

What is claimed is:

1. An optical processing apparatus comprising:
   an emitter for emitting light;
   a first light path for directing the light to a position to be processed on a workpiece;
   a processing head including
      an optical system provided in the first light path, for shaping the light,
      a second light path having a portion shared with the first light path, the second light path directing light reflected from the workpiece, and
      an optical receiver for receiving the reflected light from the second light path;
   an actuator for changing a positional relationship between the optical system and the workpiece;
   a feeder for supplying a solder to the workpiece;
   a first shifter for moving the processing head in a first direction in parallel to an optical axis of the light emitted from the emitter;
   a second shifter for positioning the feeder in the first direction away from the processing head when the processing head is moved away from the workpiece by the first shifter; and
   a third shifter for moving the feeder against the processing head in a second direction perpendicular to the first direction while the processing head is moved by the first shifter, wherein
   the optical system is configured to radiate, onto the workpiece, (a) focused light, and (b) light having a center portion and a circumference portion located outside of the center portion, the circumference portion having an energy density higher than an energy density of the center portion,
   when the optical system radiates the focused light onto the workpiece, the feeder supplies the solder to a portion of the workpiece onto which the focused light is radiated, and
   when the optical system radiates the light having the center portion and the circumference portion, the feeder supplies the solder to a portion of the workpiece onto which the circumference portion of the light is radiated.

2. The optical processing apparatus according to claim 1, further comprising a fourth shifter for moving the feeder along a circumference of a circle about the workpiece.

3. The optical processing apparatus according to claim 1, wherein the processing head is located vertically beneath the workpiece.

4. The optical processing apparatus according to claim 1, further comprising:
   a detector for detecting a position on the workpiece of a spot of light output from the first light path; and
   a display for displaying the position of the spot of the light detected by the detector and the position to be processed on the workpiece simultaneously.

5. The optical processing apparatus according to claim 4, further comprising a corrector for controlling the actuator to eliminate a difference between the position on the workpiece of the spot of the light output from the first light path and the position of the processing head.

6. The optical processing apparatus according to claim 4, further comprising a memory for storing an image of the workpiece.

7. The optical processing apparatus according to claim 1, further comprising a corrector provided in a portion of the second light path other than the portion shared by the first light path, the corrector correcting a distortion of an image generated by the optical system and supplying the optical receiver with the corrected image.

8. The optical processing apparatus according to claim 1, further comprising
   a detector for detecting a color different from a color of an impurity adhered on the optical system, wherein the actuator moves the optical system to the detector to identify the impurity.

9. The optical processing apparatus according to claim 1, further comprising:
   a detector for detecting a shape of a distal end of the solder; and
   a solder fuser provided at a position different from a position of the workpiece for fusing the solder,
   wherein, when the distal end of the solder is improper, the solder is transferred to the solder fuser to heat the distal end of the solder.

10. The optical processing apparatus according to claim 9, further comprising a heater for heating the solder fuser.

11. The optical processing apparatus according to claim 9, wherein the solder fuser is heated by the light output from the first light path.

12. The optical processing apparatus according to claim 1, further comprising a detector for detecting a position of a distal end of a solder.

13. The optical processing apparatus according to claim 1, wherein the calculator detects amounts of deflections at least at three positions closely to the position to be processed on the workpiece.

14. The optical processing apparatus according to claim 1, further comprising a corrector provided in a portion of the second light path other than the portion shared with the first light path, for correcting a distortion of an image output from the second light path.

15. The optical processing apparatus according to claim 1, further comprising:
   a detector for detecting a deflection of the workpiece;
   a calculator for calculating a compensation amount for correcting the position of the optical system based on the deflection; and
   a memory for storing the calculated compensation amount which is used for correcting a position of the optical system to offset a deflection of the workpiece,
   wherein the first shifter, the second shifter, and the third shifter are controlled based on the stored compensation amount.

* * * * *